United States Patent
Wright et al.

(10) Patent No.: US 6,353,734 B1
(45) Date of Patent: *Mar. 5, 2002

(54) WIRELESS SPREAD SPECTRUM GROUND LINK-BASED AIRCRAFT DATA COMMUNICATION SYSTEM FOR ENGINE EVENT REPORTING

(75) Inventors: Thomas H. Wright, Indialantic; James J. Ziarno, Malabar, both of FL (US)

(73) Assignee: Harris Corporation, Melbourne, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/711,436

(22) Filed: Nov. 13, 2000

Related U.S. Application Data

(63) Continuation of application No. 09/344,522, filed on Jun. 25, 1999, now Pat. No. 6,148,179.

(51) Int. Cl.$^7$ .............................. H04B 7/00; G08B 21/00
(52) U.S. Cl. ......................... 455/98; 455/431; 455/66; 701/14; 701/35; 340/945; 340/825.72; 375/130; 370/316; 342/33
(58) Field of Search ....................... 455/66, 67.1, 54.1, 455/98, 33.1, 431; 701/14, 35; 340/961, 971, 539, 945, 825.69, 725.72, 3.43; 375/130; 370/310, 316; 342/33, 36

(56) References Cited

U.S. PATENT DOCUMENTS

| | | | |
|---|---|---|---|
| 4,642,775 A | 2/1987 | Cline et al. | 701/200 |
| 4,729,102 A | 3/1988 | Miller, Jr. et al. | 701/14 |
| 4,872,182 A | 10/1989 | McRae et al. | 375/141 |
| 5,022,024 A | 6/1991 | Paneth et al. | 370/334 |
| 5,339,330 A | 8/1994 | Mallinckrodt | 370/320 |
| 5,359,446 A | 10/1994 | Johnson et al. | 359/172 |
| 5,459,469 A | 10/1995 | Schuchman et al. | 342/37 |
| 5,463,656 A | 10/1995 | Polivka et al. | 375/130 |
| 6,148,179 A | * 11/2000 | Wright et al. | 455/66 |

FOREIGN PATENT DOCUMENTS

| | | |
|---|---|---|
| EP | 0 407 179 A1 | 7/1990 |
| GB | 2 276 066 A | 9/1994 |

* cited by examiner

Primary Examiner—Donnie L. Crosland
(74) Attorney, Agent, or Firm—Allen, Dyer, Doppelt, Milbrath & Gilchrist, P.A.

(57) ABSTRACT

The system and method of the present invention provides a record of the performance of an aircraft engine. A plurality of sensors sense engine conditions and generate engine data. A ground data link unit is positioned within the aircraft and receives the engine data. A wideband spread spectrum transmitter that can be part of a transceiver downloads the engine data to a ground based spread spectrum receiver that can be part of a transceiver, and receives the wideband spread spectrum communication signal from the aircraft. It demodulates the wideband spread spectrum communication signal to obtain the engine data.

23 Claims, 14 Drawing Sheets

MINIMUM AIRSPACE SEPARATION ON A FAR 91.181 FEDERAL AIRWAY

TYPICAL AIRPORT TRAFFIC PATTERN

NUMBER OF NEAR MID AIR COLLISIONS
BETWEEN 1992 AND 1997

EN ROUTE AIRCRAFT ACTING AS REPEATERS EXTEND THE COMMUNICATION RANGE OF THE GROUND-BASED NETWORK

OMNI-DIRECTIONAL ANTENNAS PROVIDE
BOTH GROUND AND AIR COVERAGE

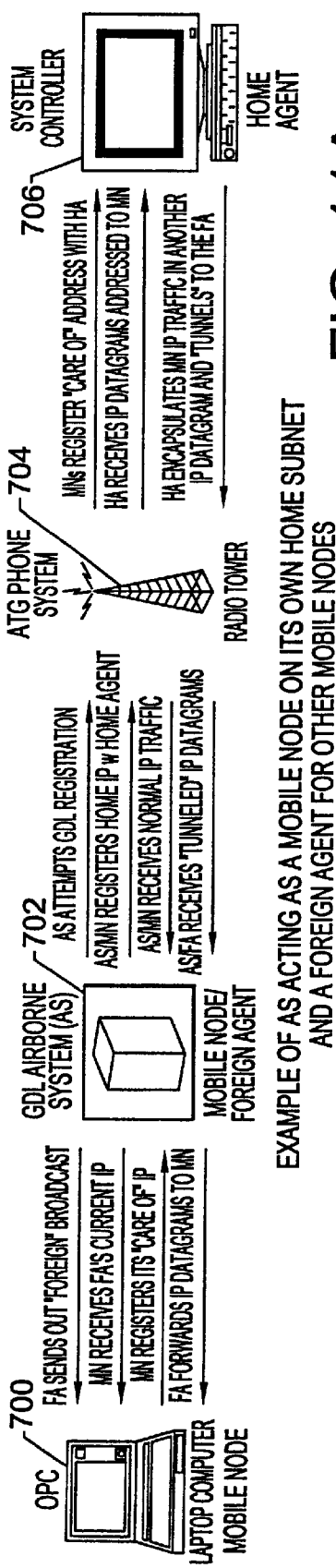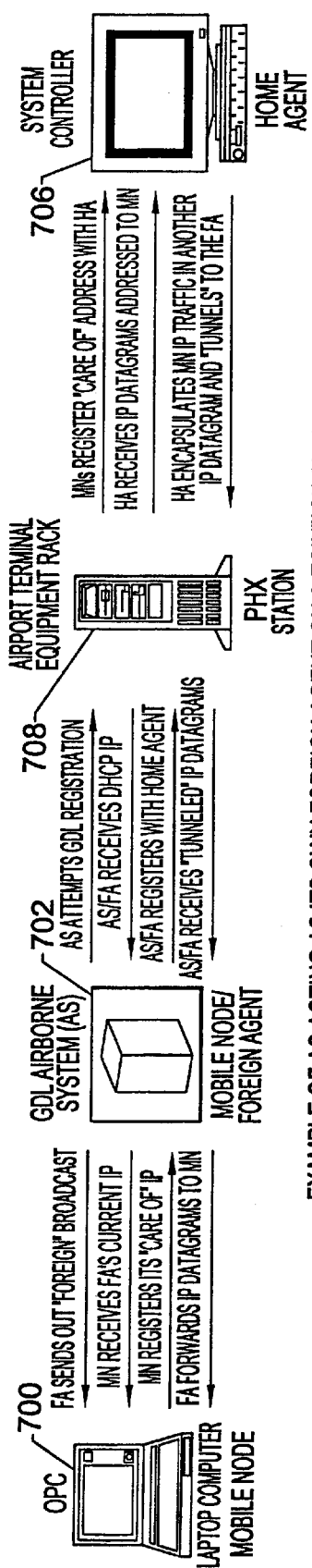

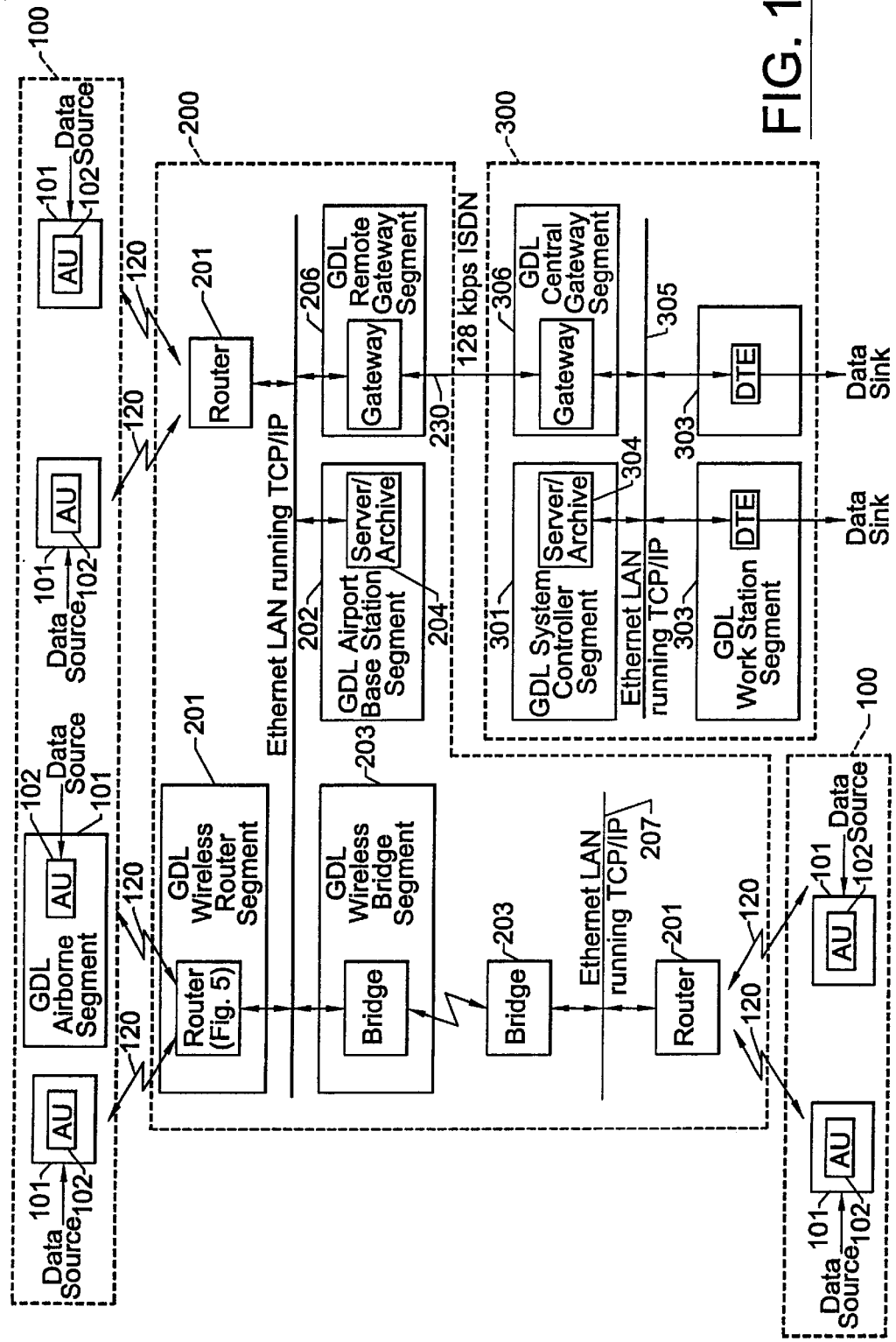

WIRELESS SPREAD SPECTRUM GROUND LINK-BASED AIRCRAFT DATA COMMUNICATION SYSTEM FOR ENGINE EVENT REPORTING

This application is a continuation of Ser. No. 09/344,5224 filed on Jun. 25, 1999, U.S. Pat. No. 6,143,179, the disclosure of which is hereby incorporated by reference in its entirety.

FIELD OF THE INVENTION

This invention relates to a system and method for providing a record of the flight performance of an aircraft and engine performance, and more particularly, to a spread spectrum ground link-based aircraft data communication system that downloads not only engine data during initial take-off, but also flight performance data after the aircraft has landed.

BACKGROUND OF THE INVENTION

A great amount of mechanical stress is placed on jet engines and their associated components during initial take-off. Some jet engine components and processes are now controlled through the well known engine air flow FADEC control system, which may include the sensing and control of core compartment bleeding, sump pressurization, sump venting, active clearance control, draining, and low pressure and high pressure recoup. In other jet engine designs, other engine sensors sense various associated components.

During initial take-off, the pilot observes many cockpit meters and observes engine performance. Based upon his analysis of the observed meters and his overall experience, the pilot may make an emergency landing or continue his flight to the destination even if he believes minor engine problems are occurring during initial take-off or in flight. If this engine data, such as that type of data contained through the engineer flow FADEC control and other sensors could be initialized initially during take-off, both onboard and on-ground, such as by a ground crew or automatic server located on the ground, better control over the engine could be exerted. Additionally, such information obtained during initial take-off could be used to determine maintenance schedules. Any immediate maintenance could be scheduled when the aircraft landed at its destination.

In copending patent application Ser. No. 08/557,269, filed Nov. 14, 1995, and entitled, "WIRELESS, FREQUENCY-AGILE SPREAD SPECTRUM GROUND LINK-BASED AIRCRAFT DATA COMMUNICATION SYSTEM," (U.S. Pat. No. 6,047,165 issued Apr. 4, 2000) the disclosure which is hereby incorporated by reference in its entirety, a ground data link system provides a wireless mechanism for transferring data files to and from aircraft while the aircraft is on the ground at ground data link equipped airports. Flight performance data representative of aircraft flight performance is * obtained during flight of the aircraft and stored in a, data store. After the aircraft lands at the airport, the data is downloaded to an airport based spread spectrum receiver that could be part of an airport based server. Although the flight performance data is collected during flight, the spread spectrum transceiver could be used for downloading data initially at take-off.

SUMMARY OF THE INVENTION

It is therefore an object of the present invention to use a wireless spread spectrum ground link-based aircraft data communication system for downloading engine data initially during take-off.

In accordance with the present invention, the system provides a record of the flight performance of an aircraft and the record of engine data that is downloaded during initial take-off. In accordance with the present invention, a plurality of sensors are positioned on the aircraft for sensing engine conditions and generating engine data relating to the operation of the engine during at least initial take-off. A ground data link unit is positioned within the aircraft and operatively connected to the plurality of sensors for receiving the engine data. A central processing unit of the ground data link unit can receive the engine data and process the data for further downloading or initial determination of engine problems. The ground data link unit includes a data store operative to accumulate and store flight performance data during flight of the aircraft. The data store can also accumulate and store engine data received from the plurality of sensors.

A spread spectrum transceiver is coupled to the data store and includes a transmitter that is operative after the aircraft completes its flight and lands at an airport to download the flight performance data that has been accumulated and stored by the data store during flight over a spread spectrum communication signal. The spread spectrum transceiver also receives the engine data and is operative to download the engine data upon initial take-off over a spread spectrum communication signal. The airport based spread spectrum receiver receives the spread spectrum communication signal from the aircraft upon initial take-off and demodulates the spread spectrum communication signal to obtain the engine data. The airport based spread spectrum receiver receives flight performance data that has been stored and downloaded from a ground data link unit after an aircraft has landed at the airport.

In one aspect of the present invention, the data store of the ground data link unit is operative to store engine data to be accumulated during flight of the aircraft and then downloaded upon landing at the destination airport. The system also includes a FADEC engine control system. The sensors are operatively connected to the FADEC engine control system. The sensors are positioned to sense at least one of the core compartment bleeding, sump pressurization, sump venting, active clearance control, and low pressure and high pressure recoup. The sensors can also be positioned to sense at least one of oil pressure, oil temperature, fuel flow and engine hydraulics.

In still another aspect of the present invention, a plurality of sensors can be located throughout the aircraft for sensing routine aircraft conditions and generating parametric data such as received by a flight data recorder representative of the aircraft flight performance during flight of the aircraft. The system can include a multiplexer connected to the plurality of sensors and the ground data link unit for receiving the parametric data and multiplexing the parametric data for delivery to the ground data link unit.

In still another aspect of the present invention, an airport based server is connected to the airport based spectrum receiver for receiving the engine data for further processing of the engine data. A remote flight operations center operatively coupled to the airport based spread spectrum receiver for receiving and processing any flight performance data downloaded from the aircraft. The spread spectrum communication signal can comprise a direct sequence spread spectrum signal and a signal within the S band. It can also comprise a signal within the range of about 2.4 to about 2.5 GHZ. The data store of the ground data link unit can further comprise means for compressing the flight performance data during the flight of the aircraft. The emitted power of the spread spectrum communication signal can be about one watt.

In a method aspect of the present invention, engine data is collected within the ground data link unit during initial take-off of an aircraft from an airport. The method comprises the step of downloading the engine data that has been collected during initial take-off over a spread spectrum communication signal to an airport based spread spectrum receiver. The method also comprises the step of demodulating within the airport based spread spectrum receiver the spread spectrum communication signal to obtain the engine data. Demodulated data is forwarded to a server for further processing. The method further comprises the step of collecting data within the ground data link unit on the flight performance of the aircraft during flight of the aircraft. The flight performance data is accumulated and stored within a data store of the ground data link unit. After the aircraft lands in an airport at completion of its flight, the flight performance data is downloaded over a spread spectrum communication signal to an airport based spread spectrum receiver. The receiver demodulates the receive spread spectrum signal to obtain the flight performance data.

In still another aspect of the present invention, the engine data is processed within an airport based server that is connected to the airport based spread spectrum receiver. The spread spectrum communication signal includes a direct sequence spread spectrum signal that can comprise a signal within the S band. The spread spectrum communication signal comprises a signal within the range of about 2.4 to about 2.5 GHz.

BRIEF DESCRIPTION OF THE DRAWINGS

Other objects, features and advantages of the present invention will become apparent from the detailed description of the invention which follows, when considered in light of the accompanying drawings in which:

FIG. 11A is a schematic drawing that shows an example of an airborne system acting as a mobile node on its own home subnet and a foreign agent for other mobile nodes.

FIG. 11B is a schematic drawing that shows an example of an airborne system acting as its own foreign agent on a foreign subnet and a foreign agent for other mobile nodes.

FIG. 12 is a block diagram showing the basic elements of a ground data link unit.

DETAILED DESCRIPTION OF THE PREFERRED EMBODIMENTS

Figure 1:
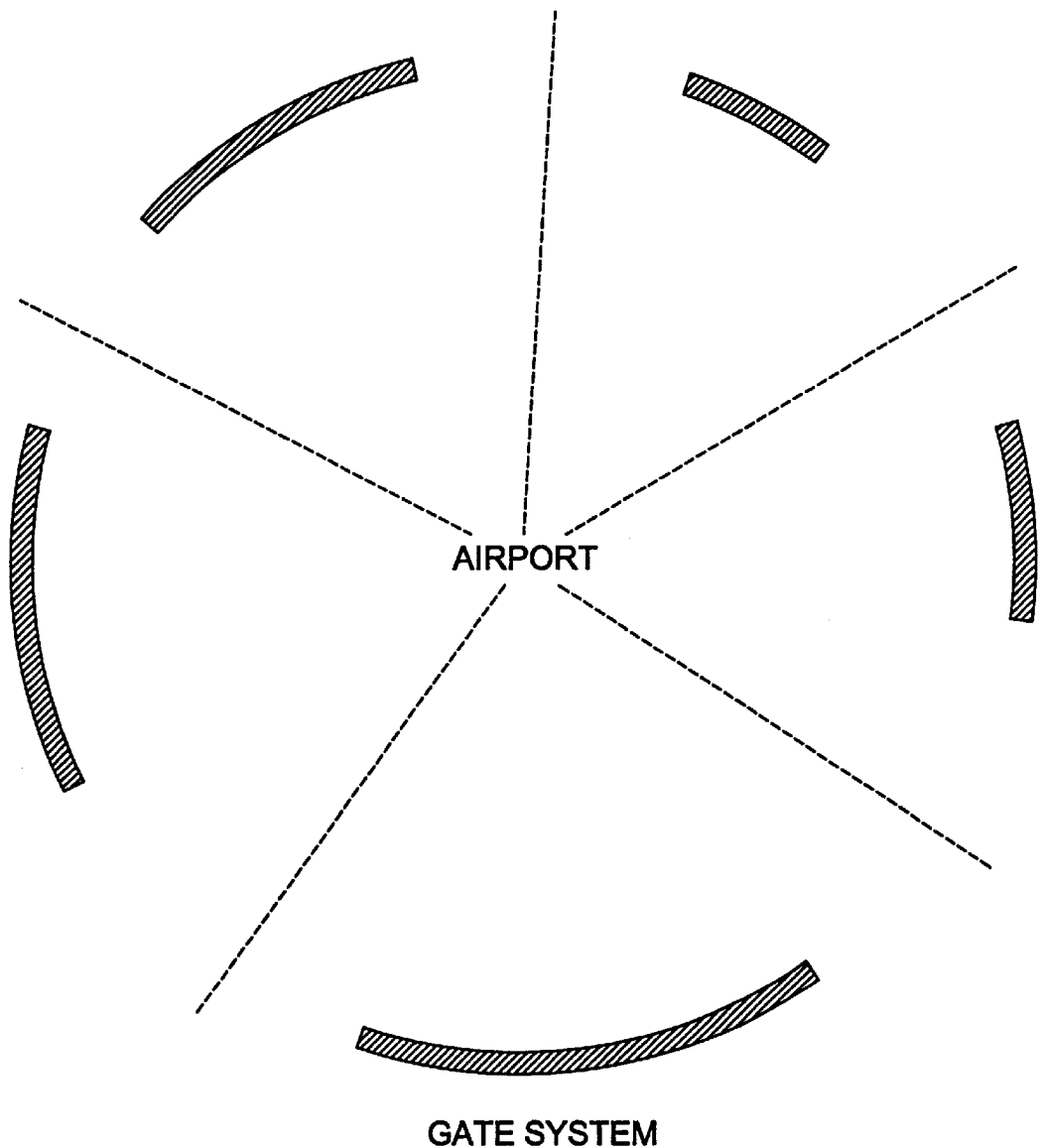
FIG. 1 is a drawing showing a representative gate system of an airport.

Harris Corporation of Melbourne, Fla. is a manufacturer of Ground Data Link (GDL), such as disclosed in copending and allowed patent application Ser. No. 08/557,269, filed Nov. 14, 1995, and entitled "WIRELESS, FREQUENCY-AGILE SPREAD SPECTRUM GROUND LINK-BASED AIRCRAFT DATA COMMUNICATION SYSTEM," the disclosure which is hereby incorporated by reference in its entirety. In the GDL, the system provides a wireless mechanism for transferring data files to and from air transport aircraft while they are on the ground at ground data link equipped airports. The ground data link is designed to support multiple airline applications, such as flight safety, engineering and maintenance, and passenger services.

In one basic application of the system and method of the invention, a ground data link unit obtains flight performance data representative of aircraft flight performance during flight of the aircraft. This type of data could be that data that is conventionally forwarded to the "black box" used in an aircraft. Different sensors receive telemetry data, which is multiplexed and sent serially to the GDL unit.

An archival data store is operative to accumulate and store flight performance data during flight of the aircraft. A wideband spread spectrum transceiver is coupled to the archival data store and includes a transmitter that is operative after the aircraft completes its flight and lands at an airport to download the flight performance data that has been accumulated and stored by the archival data store during flight over a wideband spread spectrum communication signal. An airport based wideband spread spectrum transceiver includes a receiver that receives the wideband spread spectrum communication signal from the aircraft and demodulates the signal to obtain the flight performance data. In one aspect of the invention, an adaptive power control unit varies the emitted power level of the wideband spread spectrum communication signal based upon the geographic location of the airport. In still another aspect of the invention, the airport based spread spectrum transceiver includes a probe transmission circuit that transmits a probe beacon on each sub-band frequency channel approved for use by the regulatory body of that country to the spread spectrum transceiver of the ground data link unit to determine which sub-band frequency channel is preferred. The fixed ground-based spread spectrum transceiver can be operative to select desired sub-band frequency channels and dynamically assign such sub-band frequency channels based upon the measured signal quality on each approved frequency and channel for the geographic location of the airport.

An airport based archival data store can also be coupled to the airport based wideband spread spectrum transceiver that receives and stores the flight performance data. An airport based processor can be coupled to the archival data store for retrieving flight performance data from the airport based archival data store for further processing. A remote flight operations control center can also be operatively coupled to the base station to download the flight performance data.

The present invention provides an improvement with advantageous features over the general system as disclosed in the copending and incorporated by reference '269 patent application identified above. In one aspect, the ground data link can be used in an aircraft, automobile or similar vehicle. Transmit power and frequency can be automatically adjusted to comply with the regulatory requirement of the country or area where the transceivers operate. The system can use a location sensing device to determine latitude and longitude, such as a global positioning system (GPS) receiver technology. The system is advantageous because it enables mobile units to use location information to control transmit power and frequency, as opposed to information transmitted within a fixed, ground based probe message.

The ground data link transceiver can also be used in an air-to-ground application, where the range is about 21 miles. The on-ground application uses data rates ranging from about 1 to 11 Mbps for downloading, from the aircraft, files such as electronic maintenance log books, cabin maintenance logs, weight and balance reports and flight deck computer results. During in flight, only a number of functions are transmitted and it is possible to reduce the data rate from the initial range of about 355 Kbps to improve the communication range of the network without adversely impacting throughput. Data rate can be varied to accommodate the amount and priority of data, based on the required distance. An example of a spread spectrum transceiver that can be used for the present invention, and provides data rates as high as 11 Mbps, is the type disclosed in commonly assigned U.S. patent application Ser. No. 08/819,846, filed Mar. 17, 1997, to Snell.

Additionally, engine events are sensed and stored not only in the archival storage during flight of an aircraft, but also downloaded during the first 30 seconds of take-off and/or during initial climb. Thus, it is possible for a maintenance crew or other flight operations control center to obtain data during initial take-off and climb to aid in determining whether engine maintenance would be required at the destination station. It is also possible to download OOOI times of an aircraft. Additionally, data such as the weight of the remaining fuel can be downloaded and used for refueling planning. Last minute changes in gate assignment can be uploaded. En route wind and temperature data can be downloaded and used to enhance the flight planning of subsequent flights over the same route.

The present invention is also advantageous because aircraft using the GDL network can act as wireless repeaters. Planes can be spaced five or ten miles apart and the wireless communication system of the present invention can be extended, depending on the range of various airplanes. When aircraft leave and arrive as often as every 45 seconds, an air-to-air repeater network, in accordance with the present invention, can extend the network conductivity between aircraft and the ground network. This can also enhance scheduling and airline maintenance.

A benefit of spread spectrum modulation is its inherently low energy density waveform properties, which are the basis for its acceptance for unlicensed product certification. Spread spectrum also provides the additional benefits of resistance to jamming and immunity to multipath interference. The spread spectrum signal can be both direct sequence and frequency hopping as is well known to those skilled in the art, although a DSSS standard is considered preferable in some instances over a frequency hopping standard.

Referring now to FIG. 12, there is shown a of representative example of an overall system architecture of a wireless ground link-based aircraft data communication system used with the present invention. The architecture has three interlinked subsystems: (1) an aircraft-installed ground data link (GDL) subsystem 100; (2) an airport-resident ground subsystem 200; and (3) a remote airline operations control center 300. The aircraft-installed ground data link (GDL) subsystem 100 includes a plurality of GDL airborne segments 101, each of which is installed in the controlled environment of the avionics compartment of a respectively different aircraft. Each GDL airborne segment 101 is operative to communicate with a wireless router (WR) segment 201 of the airport-resident ground subsystem 200 through a wireless communications link 120.

The wireless router segment 201 routes the files it receives from the GDL airborne segment 101, either directly to the airport base station 202 via the wired Ethernet LAN 207, or indirectly through local area networks 207 and airport-resident wireless bridge segments 203. The wireless communication link 120 can be a spread spectrum radio frequency (RF) link having a carrier frequency lying in an unlicensed portion of the electromagnetic spectrum, such as within the 2.4–2.5 GHz S-band.

As will be described, once installed in an aircraft, the aircraft unit (AU) 102 of a GDL segment 101 collects and stores flight performance data generated on board the aircraft during flight. It also stores and distributes information uploaded to the aircraft via a ground subsystem's wireless router 201, which is coupled thereto by way of a local area network 207 from a base station segment 202 of a ground subsystem 200 in preparation for the next flight or series of flights.

The uploaded information, which may include any of audio, video and data, typically contains next flight information data, such as a flight plan, dispatch release, or load manifest, and uploadable software including, but not limited to, a navigation database associated with the flight management computer, as well as digitized video and audio files that may be employed as part of a passenger service/entertainment package.

The ground subsystem 200 includes a plurality of airport-resident GDL wireless router segments 201, one or more of which are distributed within the environments of the various airports served by the system. A respective airport wireless router 201 is operative to receive and forward flight performance data that is wirelessly down linked from an aircraft's GDL unit 101 to supply information to the aircraft in preparation for its next flight, once the aircraft has landed and is in communication with the wireless router. Each ground subsystem wireless router 201 forwards flight files from the aircraft's GDL unit and forwards the files to a server/archive computer terminal 204 of the aircraft base station 202, which resides on the local area network 207 of the ground subsystem 200.

The airport base station 202 is coupled via a local communications path 207, to which a remote gateway (RG)

segment 206 is interfaced over a communications path 230, to a central gateway (CG) segment 306 of a remote airline operations control center 300, where aircraft data files from various aircraft are analyzed. As a non-limiting example, the communications path 230 includes an ISDN telephone company (Telco) land line, and the gateway segments include standard LAN interfaces. However, it should be observed that other communication media, such as a satellite links, for example, may be employed for ground subsystem-to-control center communications without departing from the scope of the invention.

The flight operations control center 300 includes a system controller (SC) segment 301 and a plurality of GDL workstations (WS) 303, which are interlinked to the systems controller 301 via a local area network 305. Flight operations and flight safety analysts are allowed at control center 300 to evaluate the aircraft data files conveyed to the airline operations control center 300 from the airport base 4 station segments 202 of the ground subsystem 200.

The respective GDL workstations 303 may be allocated for different purposes, such as flight operations, flight safety , engineering/maintenance or passenger services. As described briefly above, the server/archive terminal 204 in the base station segment 202 is operative to automatically forward OOOI reports downloaded from an aircraft to the flight control center 300; it also automatically forwards raw flight data files.

The system controller 301 has a server/archive terminal unit 304 that preferably includes database management software for providing for efficient transfer and analysis of data files, as it retrieves downloaded files from a ground subsystem. As a non-limiting example, such database management software may delete existing files from a base station segment's memory once the files have been retrieved.

Figure 13:
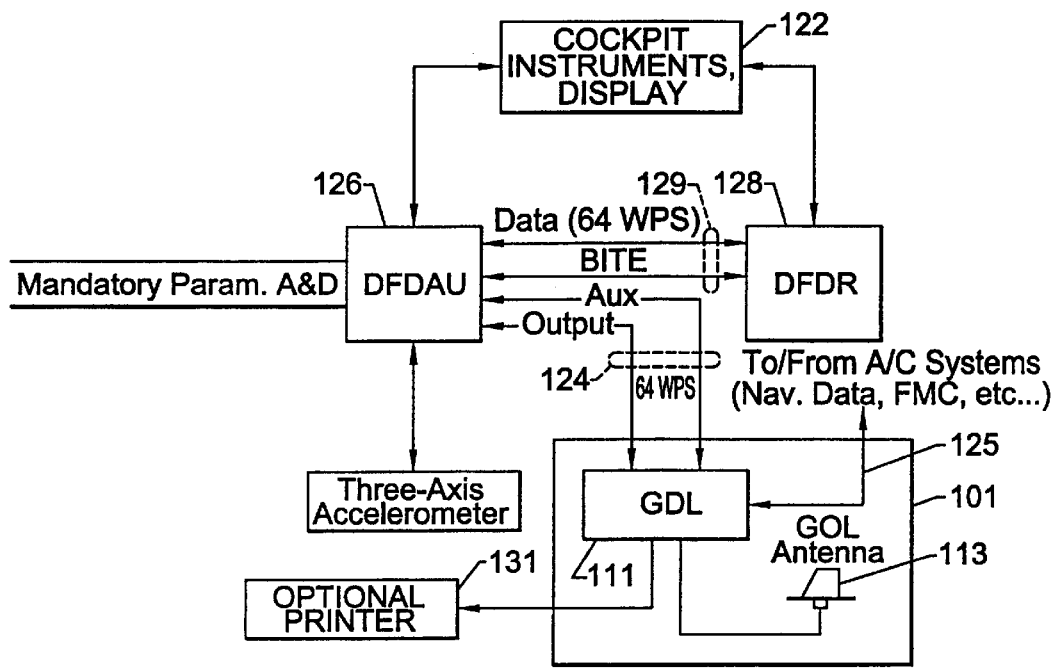
FIG. 13 is another block diagram of another part of the ground data link unit showing various components.

Referring now to FIG. 13, a respective GDL segment 101 is diagrammatically illustrated as comprising a GDL data storage and communications unit 111 (hereinafter referred to simply as a GDL unit) and an associated external airframe (e.g., fuselage) mounted antenna unit 113. In an alternative embodiment, antenna unit 113 may house diversely configured components, such as spaced apart antenna dipole elements, or multiple, differentially (orthogonally) polarized antenna components.

The GDL unit 111 is preferably installed within the controlled environment of an aircraft's avionics compartment, to which communication links from various aircraft flight parameter transducers, and cockpit instruments and display components, shown within broken lines 122, are coupled. When so installed, the GDL unit 111 is linked via an auxiliary data path 124 to the aircraft's airborne data acquisition equipment 126 (e.g., a DFDAU, in the present example). The GDL unit 111 synchronizes with the flight parameter data stream from the DFDAU 16, and stores the collected data in memory. It is also coupled via a data path 125 to supply to one or more additional aircraft units, such as navigational equipment and/or passenger entertainment stations, various data, audio and video files that have been uploaded from an airport ground subsystem wireless router 201.

The airborne data acquisition unit 126 is coupled to the aircraft's digital flight data recorder (DFDR) 128 by way of a standard flight data link 129 through which collected flight data is coupled to the flight data recorder in a conventional manner.

Figure 14:
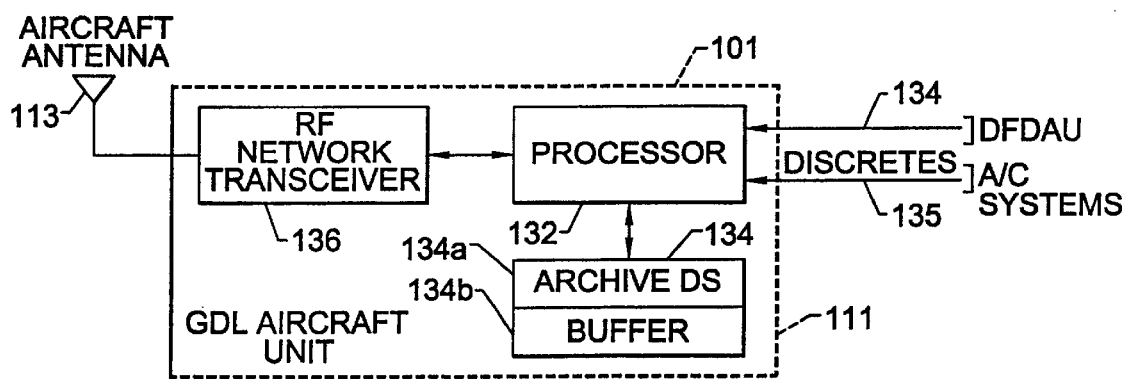
FIG. 14 is a block diagram illustrating basic components of the ground data link aircraft unit.

As described briefly above, and as diagrammatically illustrated in FIGS. 13 and 14, the GDL unit 111 can be a bidirectional wireless (radio frequency carrier-based) subsystem containing a processing unit 132 and associated memory or data store 134, serving as both an archival data store 134a and a buffer 134b for airline packet communications as described below. The memory 134 is coupled to the DFDAU 126, via data path 124, which is parallel to or redundant with the data path to the flight data recorder 128. Processing unit 132 receives and compresses the same flight performance data that is collected by the aircraft's digital flight data recorder, and stores the compressed data in associated memory 134. A report can be generated by the processing unit 132, that includes many items of data, such as the flight number/leg and tail number/tray number of the aircraft and the appropriate OOOI time.

To provide bidirectional RF communication capability with a wireless router 201, the GDL unit 111 includes a wireless (RF) transceiver 136, which is coupled to the antenna unit 113.

As will be described, on each of a plurality of sub-band channels of the unlicensed 2.4–2.5 GHz S-band segment of interest, a wireless router 201 could continuously broadcast an interrogation beacon that contains information representative of the emitted power level restrictions of the airport. Using an adaptive power unit within its transceiver, the GDL unit 111 on board the aircraft could respond to this beacon signal by adjusting its emitted power to a level that will not exceed communication limitations imposed by the jurisdiction governing the airport. The wireless (RF) transceiver 136 then accesses the report data file (such as OOOI) stored in memory 134, encrypts the data and transmits the file via a selected sub-channel of the wireless ground communication link 120 to wireless router 201.

Figure 15:
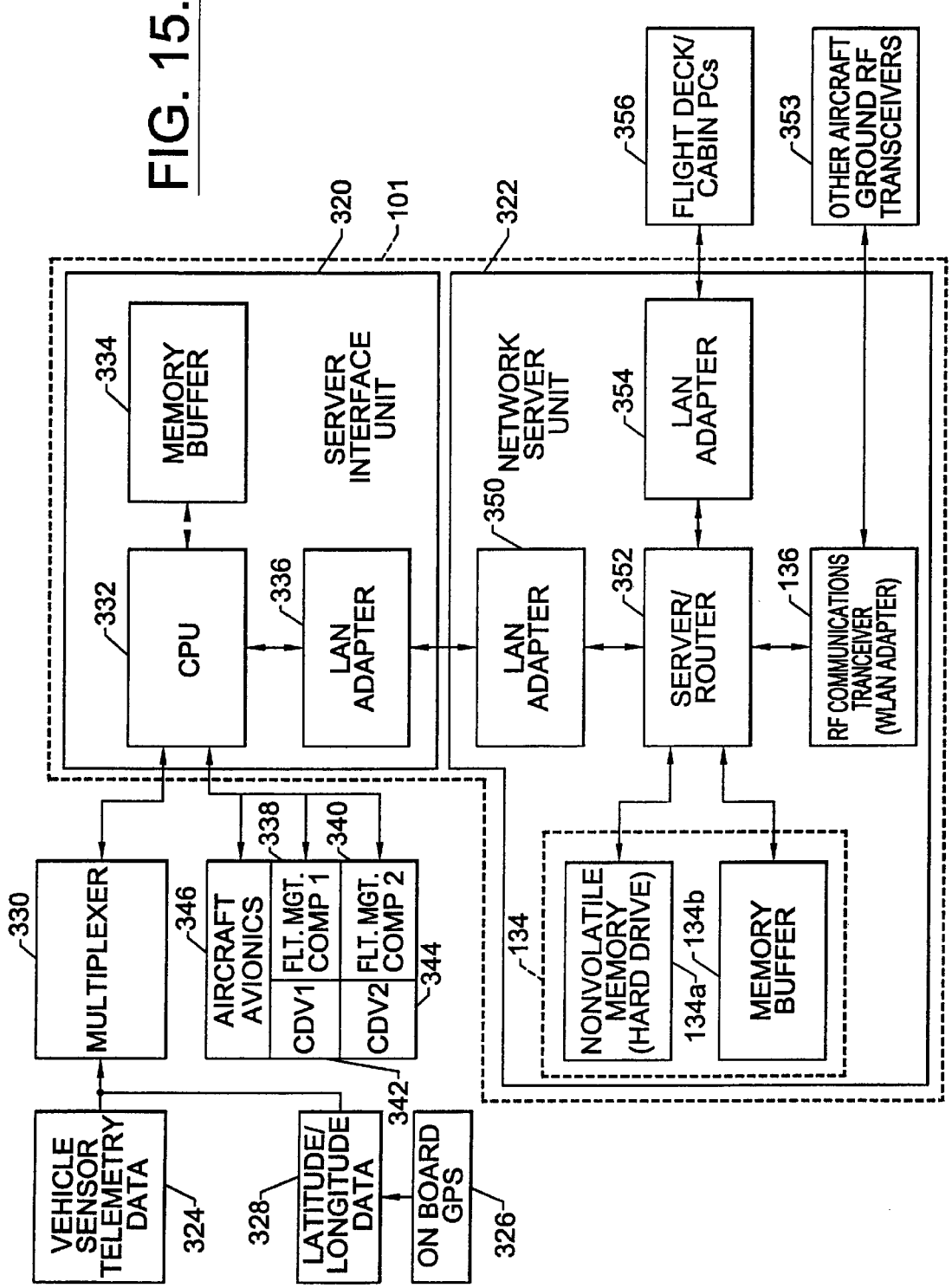
FIG. 15 is another block diagram of the ground data link unit of the present invention showing greater detail of the interconnection with flight management computers and on board GPS system.

The recipient wireless router 201 forwards the report data file to the base station segment temporarily until the report file can be automatically transmitted over the communications path 230 to the remote airline flight operations control center 300 for analysis. As shown in FIG. 15, the CPU can receive multiplexed telemetry data from multiplexer 150. An on-board GPS system 152 can provide latitude/longitude data 154, which is used for the adaptive power control and frequency channel selection based on geographical area, as described above. First and second flight management computers 160, 162 can also be updated with, files and verified as accurate by first and second Control Data Units (164, 166) as described below. Further details of the associated components are described in the above-identified and incorporated by reference '269 application.

Air Traffic Control (ATC) at busy airports requires that aircraft operate under Instrument Flight Rules (IFR) to comply with a "gate system," which provides lateral separation between arriving and departing aircraft. FIG. 1 is one type of gate system of an aircraft, which in this example, is located in Calgary. Aircraft entering the airspace enter along the Standard Terminal Arrival Routes (STAR), shown in a dotted line. Departing aircraft are vectored to exit the airspace on one of the outbound Standard Instrument Departure (SID) gates, shown in solid, circular arc lines. The actual departure gate assigned is the gate that is closest to the route of a flight.

Once a departing aircraft exits the airport airspace under the jurisdiction of the airport ATC, it proceeds along a course consistent with its flight plan as filed with the ATC. Aircraft operating under IFR travel along the centerline of a defined federal airway or on a route that is a direct course between the conventional navigational aids (VOR or TACAN) that define that route, as known to those skilled in the art. Aircraft periodically report the exact time they pass over various navigation aids so that the ATC can monitor the progress of the aircraft relative to its flight plan and other aircraft. The ATC typically manages safe aircraft separation along these defined routes to five nautical miles horizontally and 1,000 feet vertically, as shown in FIG. 2, where aircraft 10 are shown spaced horizontally and vertically.

Figure 3:
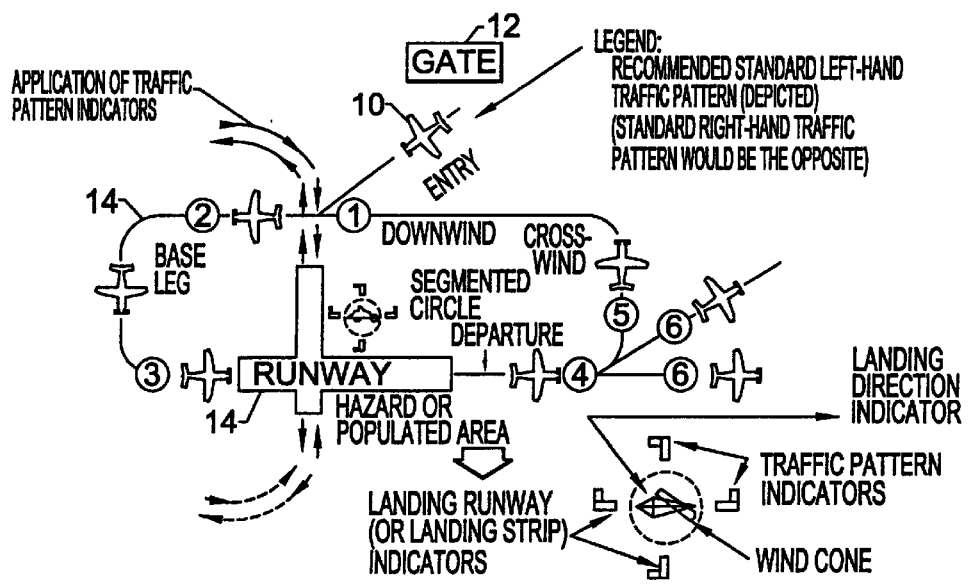
FIG. 3 is a plan diagram of a typical airport traffic pattern.

FIG. 3 illustrates an example of an airport a traffic pattern for a given runway. The turn from base leg to final approach is at least ¼ mile from the runway. The traffic pattern altitude is typically 1,000 feet above ground level. As illustrated, the aircraft 10 initially starts from a gate 12 and then proceeds to the different points labeled 1–6. The aircraft 10, as noted before, turns from the base leg to the final approach that is at least ¼ mile from the runway. At point 3, it then enters the runway 14 and at its departure indicated at point 4, the aircraft proceeds in a given direction as indicated at points 5 and 6.

Figure 2:
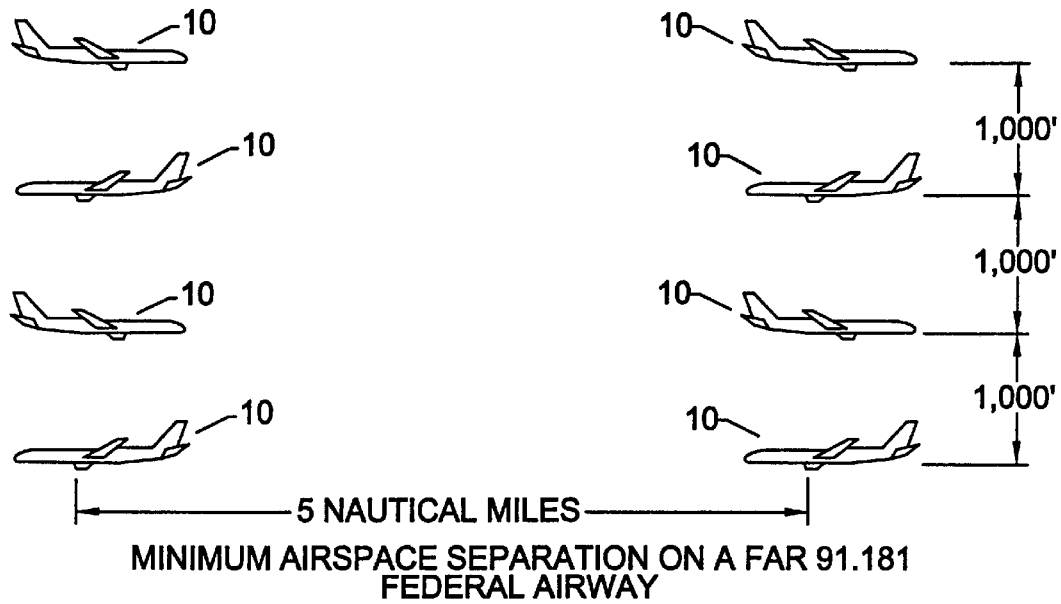
FIG. 2 is a drawing illustrating a minimum air space separation for aircraft on a federal airway.
Figure 4:
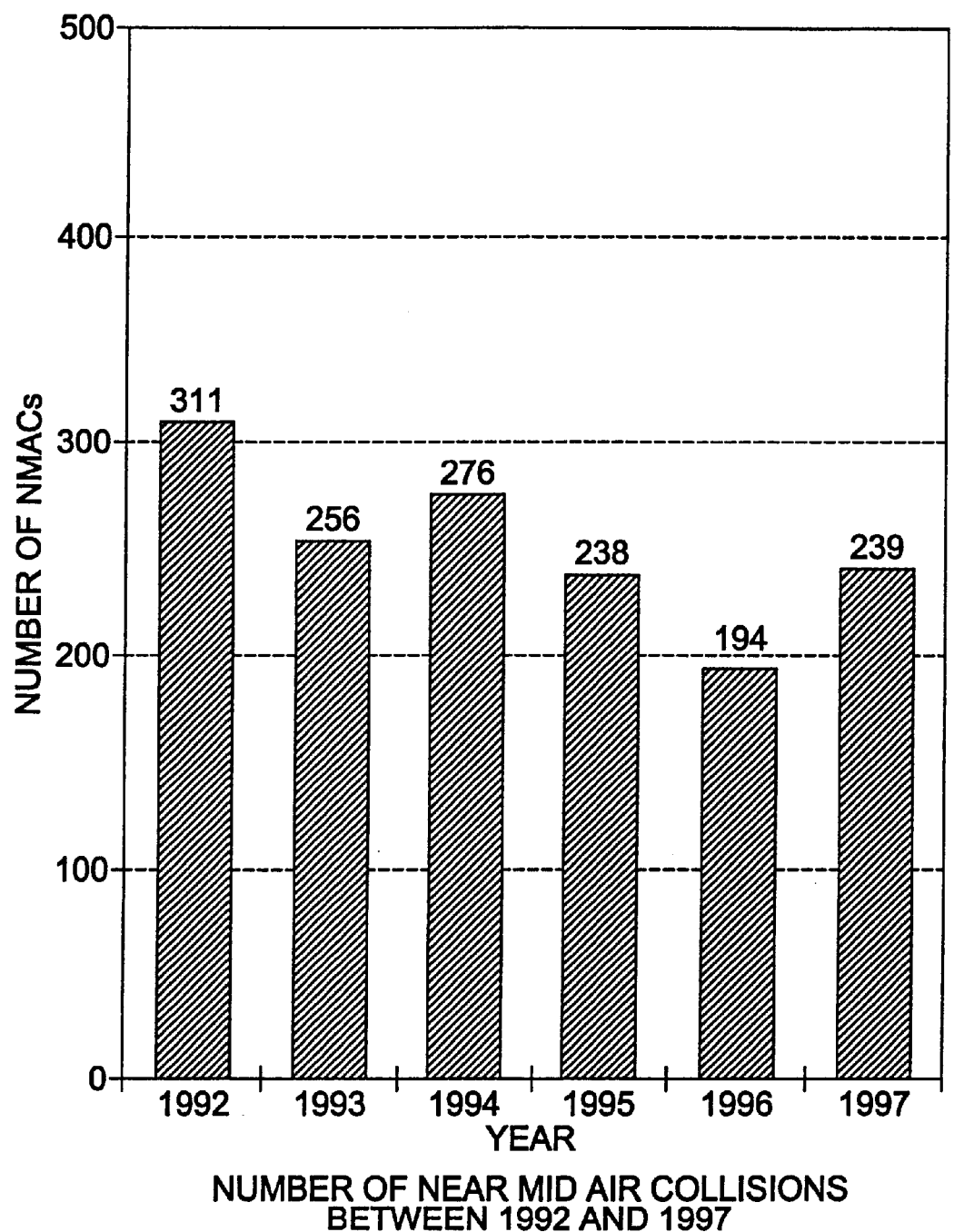
FIG. 4 is a bar chart illustrating the number of near mid-air collisions between 1992 and 1997.

As a result of air traffic congestion, particularly on routes in and out of busy airports, the minimum separation distances shown in FIG. 2 are frequently typical separation distances maintained among en route aircraft. As an example of the importance of maintaining safe en route aircraft spacing, FIG. 4 shows the number of near midair collisions reported between 1992 and 1997. Some near midair collisions, including those which may involve unsafe conditions, may not be reported because pilots fail to see another aircraft or do not perceive accurately the distance from another aircraft due to restricted visibility or the relative angle of approach. Other pilots may not report "near misses" because they fear a penalty or are not aware of the standard NMAC reporting system. Industry experts have always been studying different proposals that increase en traffic density without affecting flight safety. Pilots have been surveyed about the safety effect of reducing the separation minimums managed by ATC.

FIG. 15 illustrates a more detailed drawing of the ground data link unit where a server interface unit 320 and network server unit 322 are used. FIG. 15 explains how packets can be routed from one aircraft server/router to another aircraft and can be used for country roaming and flight management computer uploads. As illustrated, the server interface unit 320 of the ground data link unit performs data acquisition and receives telemetry data 324 such as the vehicle sensor data obtained from the plurality of sensors located throughout the aircraft or other vehicle in which the ground data link unit is positioned. An onboard global positioning system 326 can generate the latitude/longitude data 328, which can be multiplexed with the vehicle sensor telemetry data within the multiplexer 330. The server interface unit 320 includes a central processing unit 332 and a memory buffer 334 that acts as a buffer with a LAN adaptor 336, similar to an Ethernet card adaptor. The Server Interface Unit 320 can also provide interface in both directions, such as for allowing uploading to a first flight management computer 338 and a second flight management computer 340 and appropriate control display units 342, 344. Other aircraft avionics data 346 can be downloaded.

The Network Server Unit 322 includes a LAN adaptor 350 that connects for two-way communication with the LAN adaptor 336 of the server interface unit 320. A server/router 352 connects to the LAN adaptor 350, and in turn, connects to the data store 134 that includes the non-volatile memory or archival data store 134a that could be a hard drive and the buffer 134b. The server/router 352 also connects to the radio frequency communication transceiver 136, which also acts as a wireless LAN adaptor as described before. The RF communication transceiver 136 connects into other aircraft and ground radio frequency transceivers 353 as noted above. The server/router can also connects to another LAN adaptor 354, which in turn, provides two-way communication to the flight deck/cabin personal computers 356.

Figure 16:
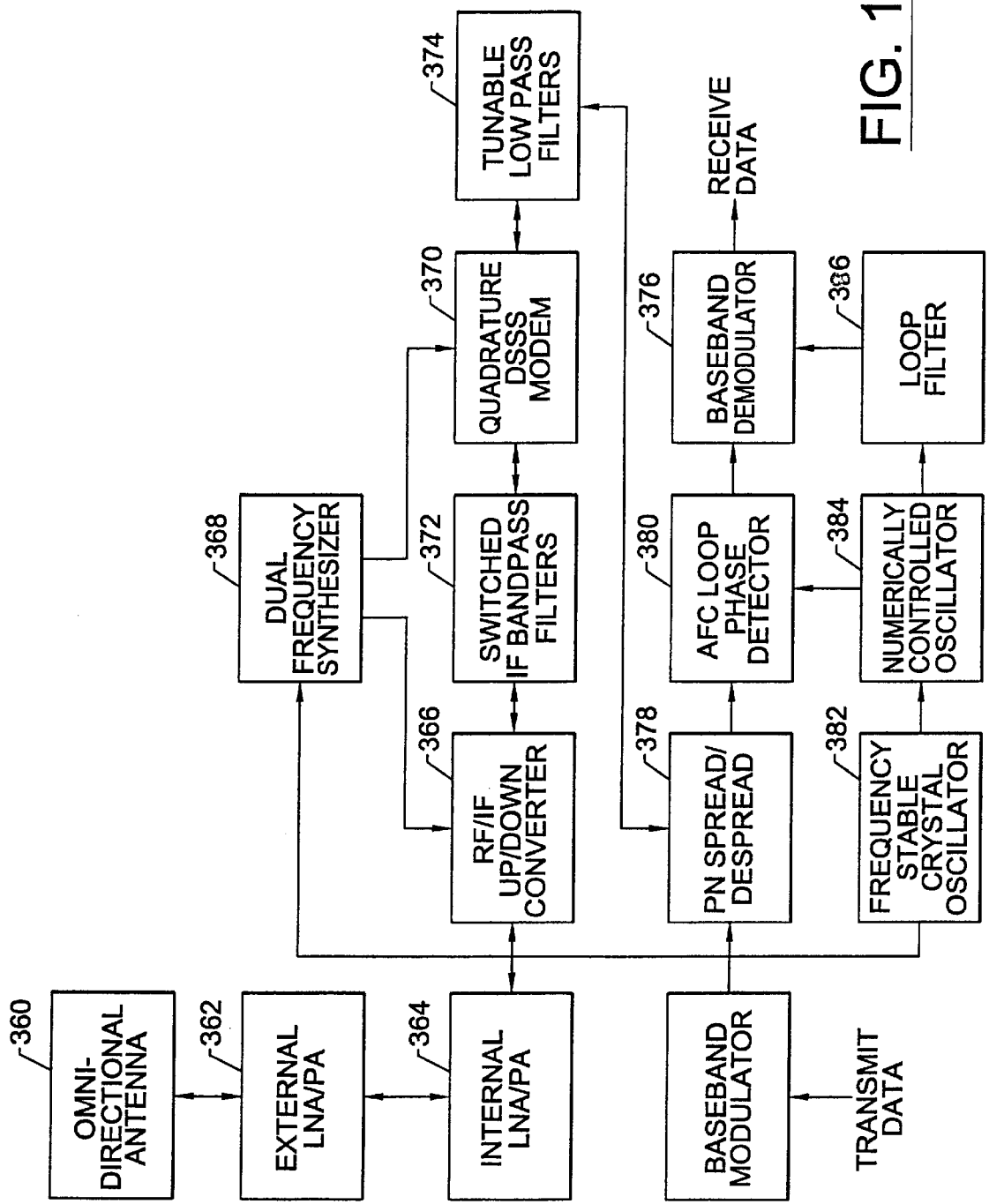
FIG. 16 is a more detailed block diagram of a type of spread spectrum transceiver that can be used with the present invention.

Referring now to FIG. 16, there is illustrated greater details of the spread spectrum communication transceiver 136 that illustrates basic elements. As shown in FIG. 16, an omni-directional antenna 360 can be used on the ground to provide gain for both the airborne and ground based applications. An external LNA/PA 362 connects into an internal LNA/PA 364 that allows two-way communication with the radio frequency/intermediate frequency (RF/IF) up/down converter 366.

A dual frequency synthesizer 368 works in conjunction with a quadrature direct sequence spread spectrum (DSSS) modem 370. A switched intermediate frequency band pass filter 372 is operative with the RF/IF up/down converter 366 and the quadrature DSSS modem 370. A tunable low pass filter 374 is operative with the quadrature DSSS modem as output. The switched IF band pass filter 372 and tunable low pass filter 374 act to reduce filter bandwidths and improve the signal/noise radio and increase communication range when the PN chipping rate and data rate is reduced. Data is transmitted into a base band modulator 376 that, in turn, is connected to the PN spread/despread circuit 378 and an AFC loop phase detector 380. A frequency stable oscillator 382 works in conjunction with the numerically controlled oscillator 384 and the loop filter 386. The frequency oscillators with sufficient frequency stability are coupled with carrier tracking loops with sufficient bandwidth to track out frequency and certainty caused by Doppler frequency ship as a result of two aircraft flying at maximum speeds in excess of 500 m.p.h. in opposite directions.

In an attempt to maintain tighter control over aircraft departure and landing times, some airlines require their flight crews to record Out, Off, On and In (OOOI) times by hand on a per flight basis. The flight crew may verbally relay the "out" and "off" times after departure to their ground based dispatch operations via a VHF transceiver. The captain's clock in the flight deck is used as the time source.

In this type of prior art system, the "out" time is defined as the moment in time when the aircraft pushes back from the gate. The release of a parking brake usually signifies the "out" time. Once the engines start, the aircraft proceeds with the taxi operation until the aircraft receives clearance from Air Traffic Control to take off. The air/ground relay is monitored to detect the precise moment when the aircraft wheels leave the runway. This time is recorded as the "off" time, i.e., weight off wheels.

The present invention is advantageous because it can eliminate the need of flight crews to manually communicate "off" times. Because this time is recorded and relayed during a high workload phase of flight, removing this requirement from flight crews improves flight safety. From an operating cost perspective, a significant amount of labor is eliminated with an automated process.

As noted before, the Ground Data Link (GDL) provides a wireless system for transferring data files to and from aircraft while on the ground at GDL equipped airports and can be used for reporting "OOOI" times. Further information concerning the reporting of "OOOI" times using the ground data link can be found in U.S. Patent Ser. No. 09/312,461, filed May 14, 1999, entitled "System and Method of Providing OOOI Times of an Aircraft," the disclosure which is hereby incorporated by reference in its entirety.

The system and method of the present invention also provides a wireless method of transferring data files to and from aircraft while airborne in the vicinity of GDL equipped airports. This system provides, in a non-limiting example, a means of automatically reporting "out" and "off" times from an aircraft in the vicinity of an airport, once the aircraft is airborne. This system also supports other applications, such as forwarding high priority aircraft performance diagnostic reports and flight crew messages.

The system and method of the present invention supports a flight safety application, referred to as Flight Operational Quality Assurance (FOQA). As noted above, telemetry data is provided by hundreds of onboard aircraft sensors. This telemetry data is recorded during flight and downloaded at GDL equipped airports. Flight files containing this data are forwarded to the airline's flight safety department. Aircraft and flight crew performance is then assessed by flight safety analysts who review recorded flight files as part of the FAA's flight operational quality assurance program. Corrective actions are identified and implemented in maintenance operations and flight crew training as appropriate to improve flight safety.

Table I identifies FOQA and other envisioned applications that require files to be downloaded from the aircraft after landing at a GDL equipped airport:

TABLE 1

| Application | File Type | File Size (k Bytes) |
| --- | --- | --- |
| FOQA/Engine Maintenance | ARINC 717 Binary Data | 3,390 |
| Electronic Maintenance Logbook | ASCII Text | 870 |
| Cabin Maintenance Log | ASCII Text | 20 |
| OOOI "On" and "In" Times | ASCII Text | 1 |

Table II identifies envisioned applications that require files to be uploaded to the aircraft prior to departure from a GDL equipped airport:

TABLE II

| Application | File Type | File Size (k Bytes) |
| --- | --- | --- |
| Flight Plan/Release | ASCII Text | 10 |
| Weight & Balance Report | ASCII Text | 10 |
| Graphical Weather | GIF File | 130 |
| FMC Nav Data Base Updates | Binary File | 1,000 |
| Onboard Performance Computer | Executable File | 10,000 |
| Online Electronic Publications | HTML or Adobe | 100 |

The system and method of the present invention also provides for collision avoidance. Based on the manner in which the ATC manages en route air transport aircraft flying along defined federal airways with defined spacing, en route aircraft can periodically report their tail number and position as a function of latitude, longitude, and altitude to aircraft within communication range. Each aircraft maintains the positions of neighboring aircraft. The GDL system of the present invention provides access to telemetry data from aircraft flight performance sensors. Thus, the en route data maintenance can be readily implemented. The GDL system of the present invention can also provide an interface to a flight deck display, which could be used to graphically display the position of neighboring aircraft as a function of time in relation to the aircraft under the control of the flight crew.

The ability to sustain communications once an aircraft is airborne enables the GDL system of the present invention to support airborne data messaging applications that are currently supported via VHF radio communications over either ARINC or private airline voice and/or data networks. These systems suffer from various undesirable characteristics such as channel capacity limitations and a lack of voice privacy. Voice channels are not only shared by all regional air traffic and ground dispatch or operations in a party line fashion, but conversations are recorded by the FAA when ATC channels are utilized.

The advantages to an airline are considerable. These advantages include capacity and low cost. In order to extend the communication range of the air-to-ground network, the data rate is reduced from about 11 Mbps to about 355 Kbps. Naturally, this reduction is only exemplary, and the actual data rate will vary depending on technical and environmental limitations, as known to those skilled in the art. This reduction in data rate improves the communication range of the network without adversely impacting its throughput. Further reductions in data rate are possible. However, further data rate reductions could adversely impact the cost of a transceiver and impact the actual data throughput and would therefore have to be carefully considered by one skilled in the art. A resultant airborne data throughput at 355 Kbps is still almost two orders of magnitude greater than the 4.8 Kbps data throughput advertised by most air-to-ground radiotelephone or SATCOM communication channels.

There are additional advantages that stem from being able to offer an air-to-ground link in conjunction with a ground-to-ground link. Adding an air-to-ground capability extends the amount of time available to transfer files to and from an aircraft while in the vicinity of the airport. An air-to-ground capability also helps lessen the impact of ground related multipath interference and blockage of signal quality when the aircraft is parked at some gates.

In accordance with the present invention, the power and frequency of the GDL system of the present invention can be changed in order to comply with the regulatory requirements of the country where the GDL transceiver is operating. Latitude and longitude information provided by location sensing devices is used to place the current location of the vehicle mounted transceiver within a predetermined set of geographic boundaries under the jurisdiction of government organizations charged with the management of RF frequency spectrum, e.g., the Federal Communications Commission (FCC). Once the vehicle is known to be within a defined geographic area, the system automatically adjusts the transmit power level and configures the frequency channel set, in order to assure compliance with the rules of the governing regulatory body.

Recent advances in Global Positioning Satellite (GPS) receiver technology have resulted in the widespread deployment of GPS receivers in a variety of communication vehicles, e.g., planes, trains and automobiles. Modern aircraft are equipped with GPS receivers which provide latitude and longitude information to various aircraft avionics systems. Older aircraft determine latitude and longitude based on other onboard sensors, e.g., gyros, air speed and altitude, as well as onboard navigation receivers and computers.

By way of background, GDL of the present invention can operate at 2.4 GHz within the North American Industrial, Scientific and Medical (ISM) equipment frequency band allocated for unlicensed operation. Europe (ETS 300 328) and Japan (RCR 27) also have frequency bands at 2.4 GHz designated for unlicensed operation. Most countries have allocated portions of the 2.4–2.5 GHz band for unlicensed operation. The issue this invention addresses is that the frequencies and maximum transmit power levels vary from country to country. Table III illustrates the problem:

TABLE III

Variation in Optimum Frequency Channels and Transmit Power Level as a Function of Country

| Country | Freq Ch A | Freq Ch B | Freq Ch C | Transmit Pwr |
| --- | --- | --- | --- | --- |
| US* | 2427 MHZ | 2457 MHZ | N/A | 1 Watt |
| Canada* | 2427 MHZ | 2457 MHZ | N/A | 1 Watt |
| Mexico* | 2427 MHZ | 2457 MHZ | N/A | 1 Watt |
| New Zealand* | 2427 MHZ | 2457 MHZ | N/A | 1 Watt |
| ETSI | 2412 MHZ | 2442 MHZ | 2472 MHZ | 100 mWatt |

TABLE III-continued

Variation in Optimum Frequency Channels and Transmit Power Level as a Function of Country

| Country | Freq Ch A | Freq Ch B | Freq Ch C | Transmit Pwr |
|---|---|---|---|---|
| (Europe)*** | | | | |
| Germany*** | 2412 MHZ | 2442 MHZ | 2472 MHZ | 100 mWatt |
| Japan** | 2484 MHZ | N/A | N/A | 100 mWatt |
| France* | 2457 MHZ | N/A | N/A | 100 mWatt |
| Australia**** | 2411 MHZ | 2439 MHZ | N/A | 100 mWatt |
| U.K.** | 2460 MHZ | N/A | N/A | 100 mWatt |
| Spain** | 2460 MHZ | N/A | N/A | 100 mWatt |

*Frequencies shown are the optimum choice for the GDL application. Others are available but are less desirable.
**Frequency shown is the only frequency available.
***Only frequencies available if 3 simultaneous channels are required.
****Only frequencies available if 2 simultaneous channels are required.

The GDL system of the present invention uses location information to control transmit power as opposed to information contained within a probe message transmitted by a fixed, ground-based transmitter. Transmit power is controlled to comply with local regulatory requirements as opposed to minimizing interference or power consumption.

The present invention uses location information to configure the frequency channel set as opposed to signal quality estimates or some pseudo random algorithm. The frequency channel set is controlled to comply with local regulatory requirements as opposed to maintaining or optimizing link quality.

Figure 5:
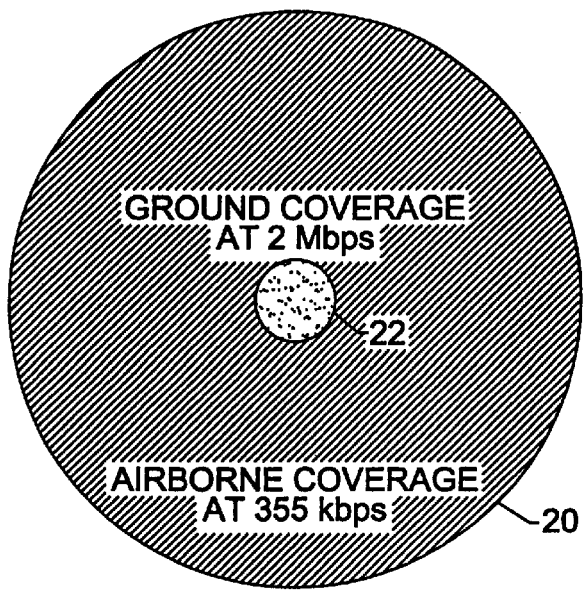
FIG. 5 is a schematic diagram showing the ground coverage cell and an airborne coverage cell.
Figure 5A:
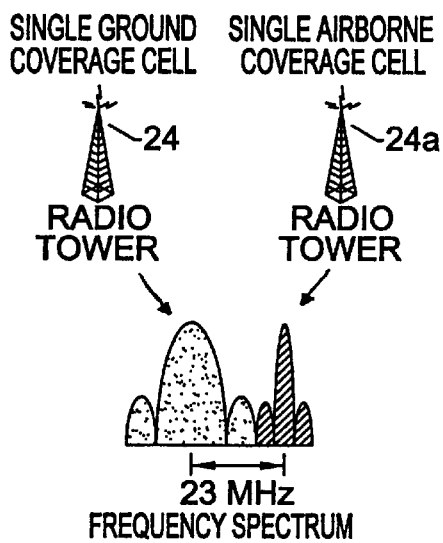
FIG. 5A is a frequency spectrum graph for a single ground coverage cell and a single airborne coverage cell.

FIG. 5 illustrates the relative coverage areas, channel frequency assignments, and data rates for a single "air" cell 20 represented by radio tower 24a and a single "ground" cell 22 represented by radio tower 24 at an airport. The graph in FIG. 5A illustrates the frequency spectrum.

In the system and method of the present invention, access to the overall network is limited by regulatory body transmit power restrictions to proximal access to GDL equipped airports. Most airlines operate out of hub airports to provide centralized locations for making connections between flights to and from remote stations. Because of any given aircraft's frequency of visiting hub airports, they are preferred locations for deploying GDL ground infrastructure of the present invention.

Figure 6:
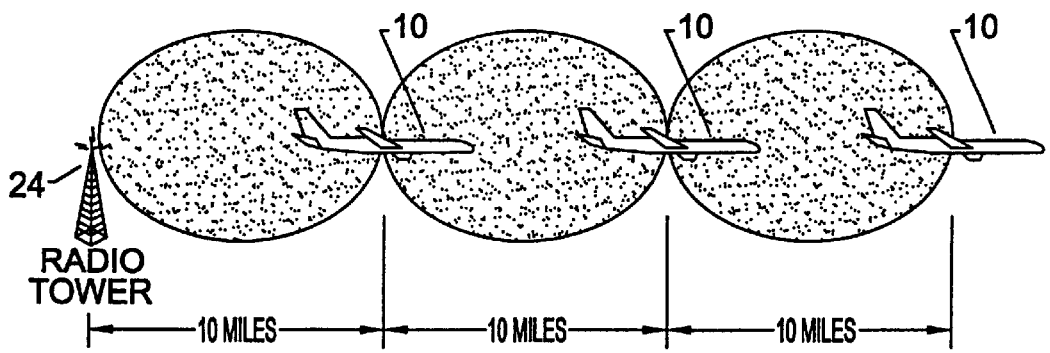
FIG. 6 is a schematic diagram illustrating how en route aircraft can act as repeaters to extend the communication range of a ground-based network.

Because of the large concentration of aircraft in and out of these hub airports to allow passengers to make connections during specific windows of time, these hub airports also offer the ability to significantly extend their communication range to departing and arriving aircraft. Because air transport aircraft that fly in and out of busy airports have ATC managed separation distances, the aircraft are constrained to follow defined inbound and outbound vectors. These aircraft are further constrained under IFR to follow defined Federal Airways, which only helps to extend the communication range of the hub airport. These flight constraints enable en route aircraft that are outside the communication range of the ground network to be used as wireless repeaters to significantly extend the range of the network, as shown in FIG. 6.

A variety of data messaging applications can occur immediately following takeoff and can be relayed or transmitted directly by the system and method of the present invention. One data messaging application provides the actual "out" and "off" times for OOOI reporting. This capability can be supported by this system either manually or automatically. Also, takeoff related engine events can be reported based on real time parameter exceedances. Both of these applications are supported by the air-to-ground link.

Figure 6A:
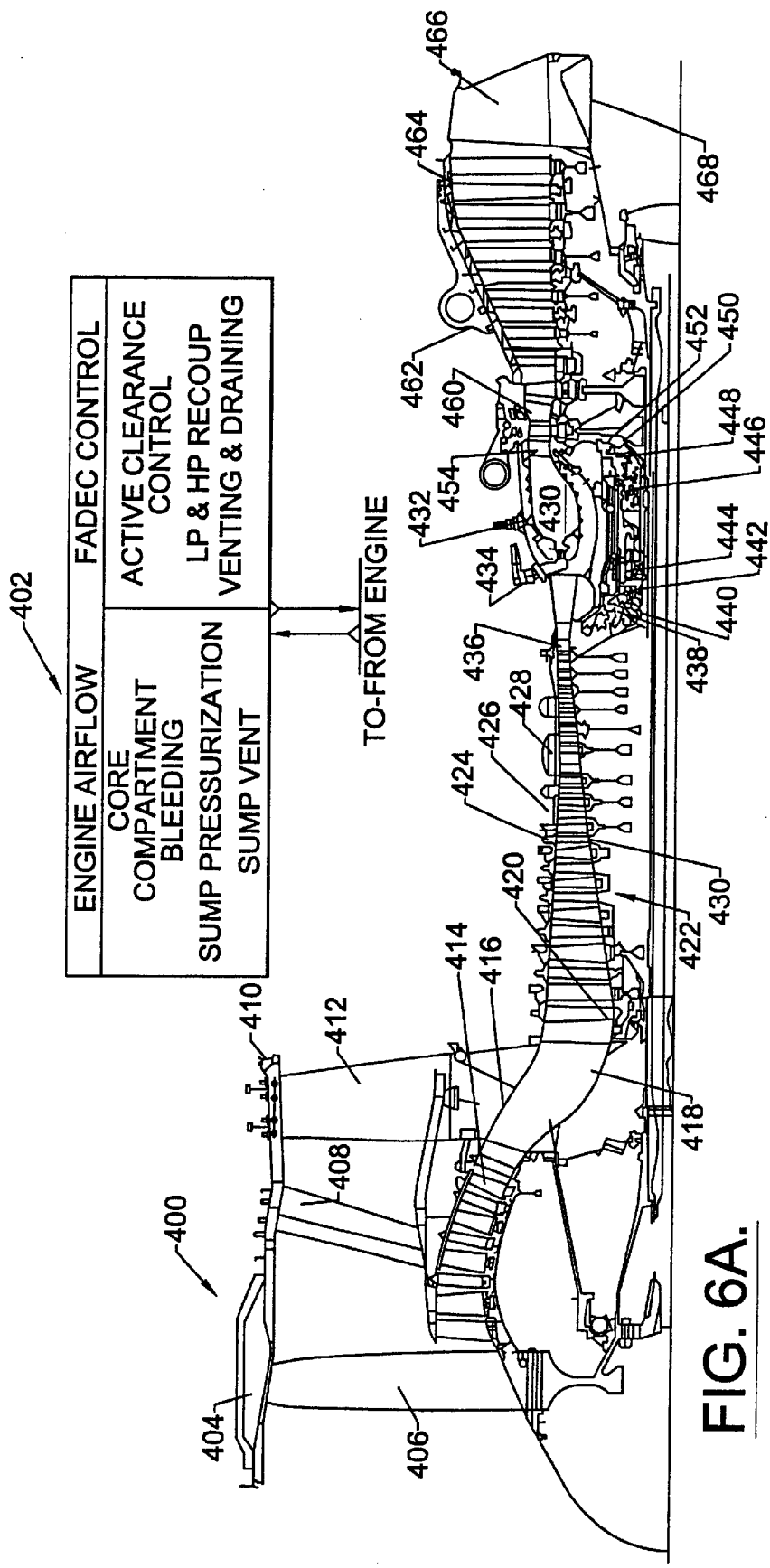
FIG. 6A is a cross-section of an example of a jet engine that generates engine events to be transferred from the ground data link unit of the present invention while en route after initial aircraft take-off.

FIG. 6A illustrates one cross-section of a jet engine indicated generally at 400, showing basic components and engine air flow FADEC control 402 to and from the jet engine that can be used for real time monitoring of engine events. These events could be downloaded during the first minute or so of initial take-off to a remote diagnostic center that could determine if on wing maintenance is warranted at the destination station.

For purposes of clarity, reference numerals to describe this jet engine begin in the 400 series. As shown in FIG. 6A, the engine air flow FADEC control 402 could include the core compartment bleeding; sump pressurization; sump venting; active clearance control; low pressure and high pressure recoup; and venting and draining functions. These functions could be monitored through basic FADEC control system 402, as known to those skilled in the art. The engine example in FIG. 6A corresponds to a General Electric CF6-80C2 advanced design with a FADEC or PMC control having an N1 thrust management and common turbo machinery. Although this jet engine is illustrated, naturally other control systems for different jet engines could be used, as known to those skilled in the art.

The engine as illustrated has six variable stages and a ruggedized stage one blade with a low emission combuster and 30 pressurized nozzles and improved emissions. It has a Kevlar containment to give a lower containment weight and a composite fan OGV. It has an enhanced HPT with a DS stage of one blade material and a TBC, with advanced cooling and active clearance control.

The fan module includes an aluminum/Kevlar containment 404 and a 93-inch improved aero/blade 406. It has compositive OGV's 408 with an aluminum/composite aft fan case 410 and a titanium fan frame 412 for reduced losses. It additionally has a four stage orthogonal booster 414 and a variable bypass valve (VBV) between the fan struts (with 12 locations) 416. The engine includes a compressor inlet temperature (CIT) probe 418.

The high pressure compressor includes an IGV shroud seal 420 and a blade dovetail sealing 422 with a trenched casing of stages 3–14 424. The compressor includes a vane platform sealing 426 and a short cord stage 8 low loss bleed system 428 and improved rubcoat reduced clearances 430.

The compressor rear frame includes a combuster 430 and ignitor plug 432 with a fuel nozzle 434 and OGV 436. It includes a vent seal 438 and 4R/A/O seal 440 and 4R bearing 442 and 4B bearing 444. It also includes a 5R bearing 446 and 5R/A/O seal 448, a diffuser 450 and pressure balance seal 452. The compressor rear frame also includes a stage 1 nozzle 454.

The high pressure turbine area includes an active clearance for control stages 1 and 2, and coated shrouds indicated at 456. It also includes directionally solidified stage 1 blades and damped blades 458 and a cooling air delivery system. The highly pressure turbine include a thermally matched support structure, and an active clearance control and simplified impingement with a cradled vane support and linear ceiling. The improved inner structure load path has improved roundness control, solid shrouds and improved ceiling. These components are located in the area generally at 460 of the high pressure turbine area.

Low pressure turbine technology area includes a clearance control 462, a 360° case 464, aerodynamic struts 466 that remove swirl from the exit gas and a turbine rear frame 468 formed as a one piece casting.

Many of these components can have sensors and structural force sensor that generate signals during initial take-off such that signals are relayed via the ground data link unit to an on-ground maintenance crew and/or separate remote operations control center having its own processor.

Figure 6B:
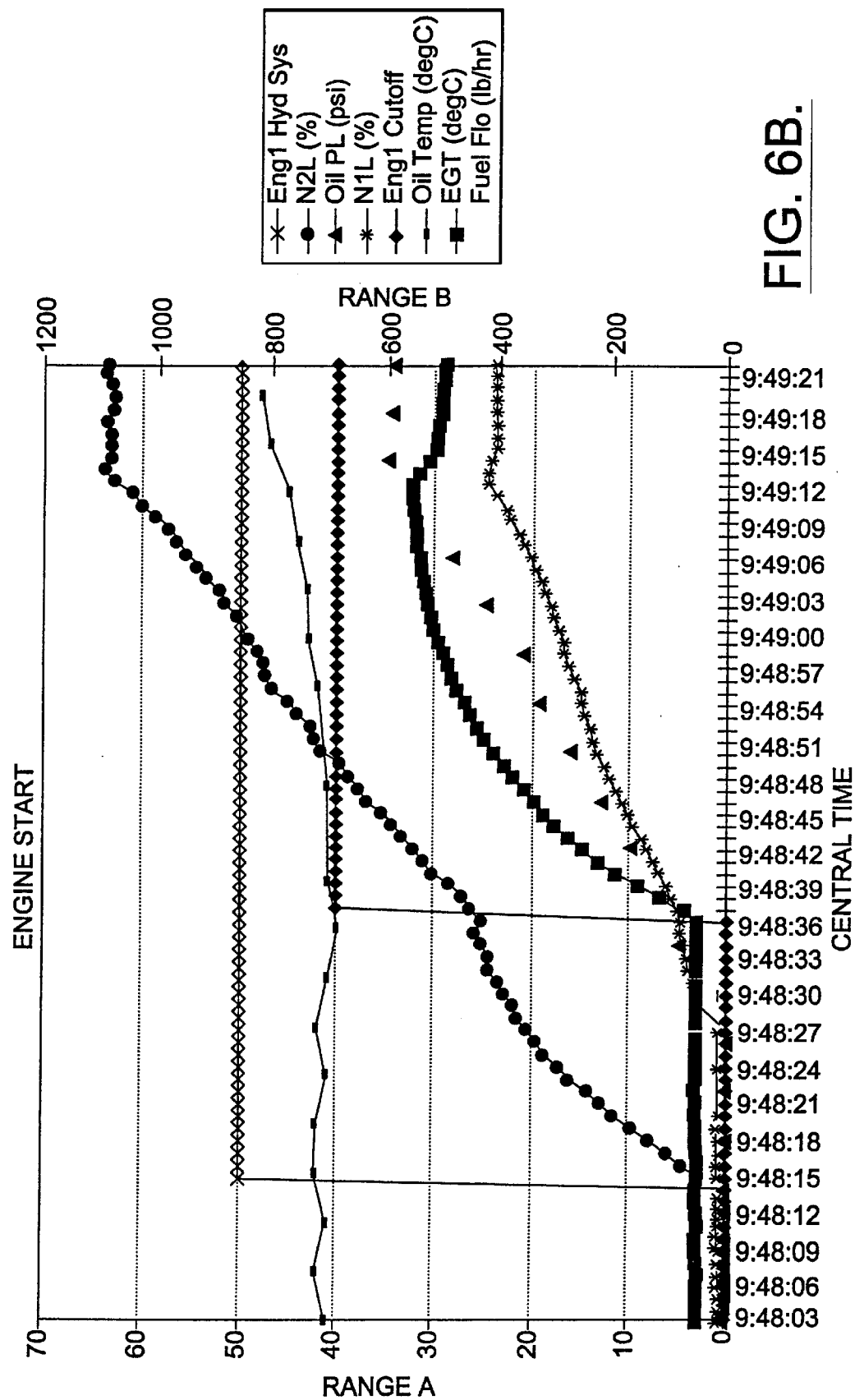
FIG. 6B is a chart showing various jet engine event reports at engine start.

FIG. 6B illustrates components that were monitored during engine start in one example, including the engine hydraulic system, the oil pressure (psi), the engine cut-off switch, oil temperature (deg C), fuel flow (lb/hr), the N2L and N1L both in percentage terms, and oil temperature and EGT, both in centigrade. The ranges are shown on the vertical axis of the graph, while time is shown on the horizontal axis of the graph.

This information can be downloaded via the ground data link unit of the present invention to a ground based processor, where a remote diagnostic center can determine if on wing maintenance is warranted at the destination station.

Table II identifies two sets of possible post departure data messaging applications:

TABLE IV

| Application | File Type | File Size (k Bytes) |
|---|---|---|
| OOOI "out" and "off" times | ASCII text | 1 |
| Engine event reporting | Binary file | 0.3 |

Other post messaging applications, as will be described below, and other applications as suggested to those skilled in the art can also be developed with the ground data link unit of the present invention. There are also en route data messaging applications that occur during approach that also lend themselves to the GDL air-to-ground link of the present invention. Flight crews currently phone in their fuel weight so that ground operations can calculate how much fuel will need to be added for the next flight. This allows more efficient scheduling and control over fuel resources. Also at this time, the aircraft crew receives their gate assignment from ground operations. En route wind and temperature data could also be monitored during flight and automatically relayed to dispatch prior to landing to aid in flight planning.

The Digital Automatic Terminal Information Service (ATIS) weather information could be uploaded via an air-to-ground link. ATIS is the continuous broadcast of recorded non-control information in high activity terminal areas. Its purpose is to improve pilot and controller effectiveness and relieve frequency congestion by automating the repetitive transmission of essential but routine information. ATIS information includes the latest hourly weather information, i.e., ceiling, visibility, obstructions to visibility, temperature, dew point (if available), wind direction (magnetic) and velocity, altimeter, and in some instances, the instrument approach and the runway in use.

Table V identifies other approach data EM messaging applications that can be used in the present invention:

TABLE V

| Application | File Type | File Size (k Bytes) |
|---|---|---|
| Fuel weight reporting | ASCII text | 1 |
| Gate assignment | ASCII text | 1 |
| En route wind & temp reporting | ASCII text | 10 |
| Digital ATIS | ASCII text | 10 |

Other applications can be used as noted before, and as suggested by those skilled in the art. Other important features that can be incorporated into the ground data link of the present invention include:

1. The use of en route aircraft acting as repeaters to extend the communication range of the airport ground infrastructure.

2. Raising the above ground antenna height of the aircraft in order to eliminate ground multipath, the dominant propagation loss factor in terrestrial radio communication links.

3. The reduction of link data rate and corresponding narrowing of baseband filters to improve signal-to-noise ratio and thereby increase communication range.

4. The selection of a frequency use band below the resonant frequency of oxygen and water molecules in order to minimize the effects of atmospheric absorption loss and rain fading on communication range.

Figure 7:
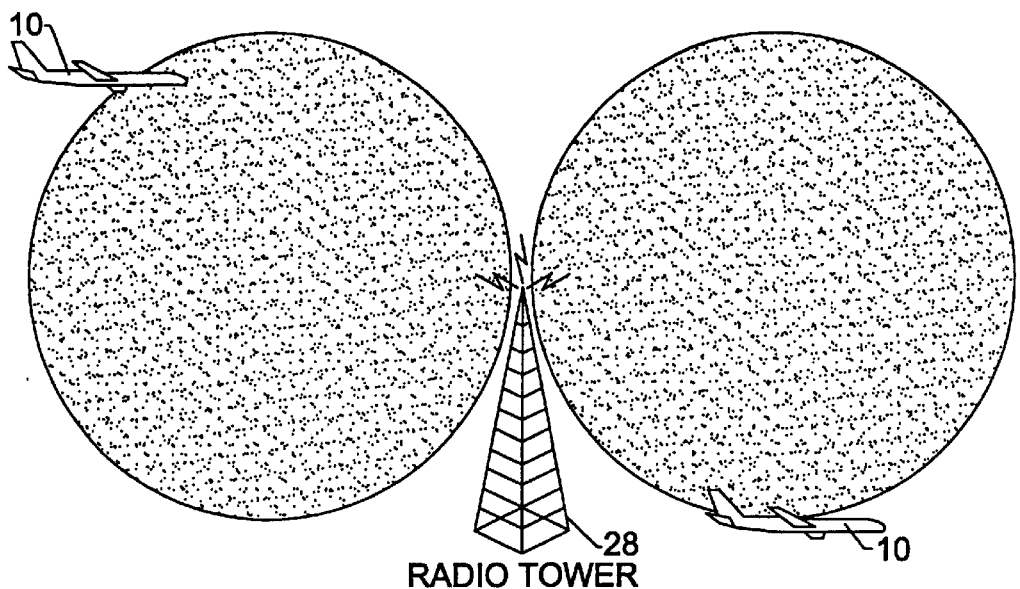
FIG. 7 is a schematic diagram of an omni-directional antenna providing both ground and air coverage that can be used with the present invention.

5. The use of Omni-directional antennas 28 on the ground to provide gain for both the airborne and ground based applications, such as shown in FIG. 7.

6. The use of frequency oscillators with sufficient frequency stability coupled with carrier tracking loops with sufficient bandwidth to track out frequency uncertainty caused by Doppler frequency shift as a result of two aircraft flying at maximum speeds in excess of 500 miles/hour in opposite directions.

The following description will now proceed using as example a vehicle, e.g., aircraft. The ground data link unit of the present invention could be used on different moving vehicles besides an aircraft.

Figure 8:
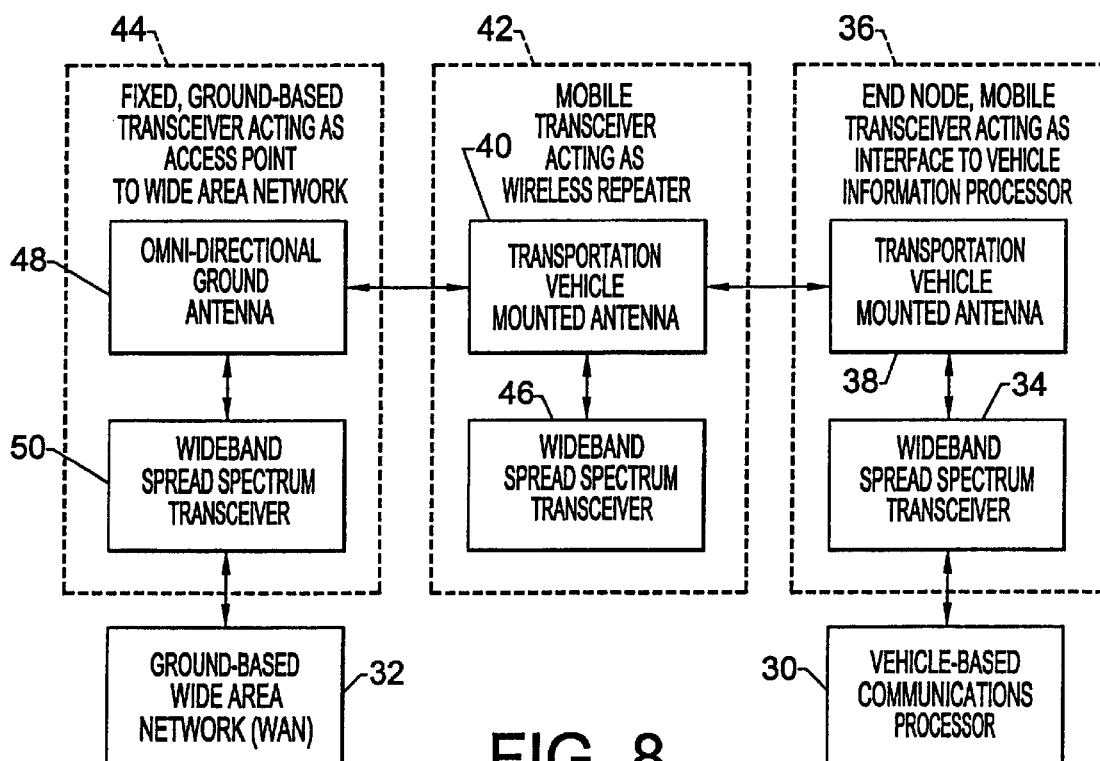
FIG. 8 is a block diagram illustrating the use of the ground data link unit of the present invention with various end nodes.

In one embodiment shown in FIG. 8, vehicle-based (e.g., aircraft based) communications processor 30 receives data from aircraft telemetry sensors for subsequent transmission to a ground-based Wide Area Network (WAN) 32 while the vehicle is en route, as will be explained. The vehicle-based communications processor 30 formats the data for transport at the network and transport layer and sends the formatted data to Wideband Spread Spectrum Transceiver 34, along with the address of the destination node, which is part of the end node of a mobile transceiver acting as an interface to a vehicle information processor, as shown by dotted lines at 36.

The wideband spread spectrum transceiver 34 formats the data for transmission at the data link layer and transmits the data via a transportation vehicle mounted antenna 38. The wideband spread spectrum transceiver 34 transmits within a frequency band below the resonant frequency of oxygen and water molecules in order to minimize the effects of atmospheric absorption loss and rain fading on the communication range. The wideband spread spectrum transceiver 34 also uses a lower data rate than that used on the ground and correspondingly narrows its baseband filters to improve the signal-to-noise ratio A and thereby increase the communication range.

A transportation vehicle mounted antenna 40, which is part of a mobile transceiver acting as a wireless repeater 42, is externally mounted on a second transportation vehicle that is within the communication range of both the first transportation vehicle, and the ground-based WAN access point, indicated by dotted line 44. The transportation vehicle mounted antenna 40, which is connected to a wideband spread spectrum transceiver 46, receives the transmission from the transportation vehicle mounted antenna 38. The wideband spread spectrum transceiver 46 uses a frequency oscillator with sufficient frequency stability and a carrier tracking loop with sufficient bandwidth to track out the frequency uncertainty caused by any Doppler frequency shift.

The worst case Doppler shift occurs as a result of two aircraft flying at maximum speeds in excess of 500 miles/hour in opposite directions. The wideband spread spectrum transceiver 46 recognizes the destination address contained within the transmission as being associated with the ground-based WAN access point with which it can also communicate. The wideband spread spectrum transceiver 46 retransmits each data packet that it receives from the wideband spread spectrum transceiver 34, via the transportation vehicle mounted antenna 40. The wideband spread spectrum transceiver 46 retransmits each data packet so that the ground-based WAN access point 44 can receive each packet.

As further illustrated, an omni-directional ground antenna 48 at the access point 44 is connected to the wideband spread spectrum transceiver 50, and receives a transmission from the transportation vehicle mounted antenna 40. The omni-directional ground antenna 48 is installed on a mast atop a building or other structure in order to position it as high above the ground as practical. Raising the above ground antenna height helps to eliminate ground multipath, the dominant propagation loss factor in terrestrial radio communication links.

The omni-directional ground antenna 48 provides gain in an upward direction, in order to support air-to-ground communications as well as gain in a downward direction, in order to support ground-to-ground communications. The wideband spread spectrum transceiver 50 also employs a frequency oscillator with sufficient frequency stability and a carrier tracking loop with sufficient bandwidth to track out the frequency uncertainty caused by Doppler frequency shift. The wideband spread spectrum transceiver 50 recognizes the destination address contained within the transmission as being associated with a ground-based WAN network device and forwards the data packets it receives to the ground-based wide area network 32.

The air-to-ground link is advantageous as described and the following results give examples of its usefulness, taking into account factors such as Doppler and weather. In addition, given the landing and departure rates at airports where airlines have a large number of allocated gates, air-to-air links are a viable means of extending an aircraft's access to the ground network in the vicinity of an airport. There are also routine airline applications that could benefit from the described air-to-ground capability in the vicinity of major airports.

The communication range for a GDL air-to-ground link of the present invention can be about 21.6 miles (114,000 feet), as shown by the analysis below:

| | | |
|---|---|---|
| To calculate Receive Power, Pr: | | |
| Pr = Pt(dBm) = Gr(dBi) + Gt(dBi) + | | |
| Lambda^2/(4sd)^2(dB) + Lo | | |
| Where dBi = dB's referenced to isotropic gain | | |
| Pt = Transmit power in dBm | Enter Pt: | 30.00 |
| Gt = Transmit antenna gain in dBi | Enter Gt: | 0.00 |
| Gr = Receive antenna gain in dBi | Enter Gr: | 5.15 |
| Lambda (wavelength) = 300/fc in MHZ | Enter fc: | 2,462.00 |
| d = Distance in feet | Enter d: | 114,150.00 |
| Lo = Other misc link losses in dB | Enter Lo: | (0.25) |
| Pr = Receive power in dBm | Answer Pr: | (96.2) |
| To calculate Path Loss, Ls: | | |
| Ls = Pr(dBm) − Pt(dBm) − | | |
| Gt(dBi) − Gr(dBi) | | |
| Where Ls = Path Loss in dB | Answer Ls: | (131.35) |
| To calculate Receive Sensitivity, G/T°: | | |
| G/T° = Gr(dBi) − Ts(dB) | | |
| Where F = Receive Noise Figure in dB | Enter F: | 7.01 |
| Tr = Effective Rx noise temp, °K. | Answer Tr: | 1,166.79 |
| Tr = Effective Rx noise temp, (dB-K) | Answer Tr: | 30.67 |
| Tl = Link noise temp, °K. | Enter Tl: | 100.00 |
| Tp = Antenna physical temp, °C. | Enter Tp: | 43.33 |
| Ta = Antenna noise temp, °K. | Answer Ta: | 144.49 |
| Ts = System noise temp, °K. | Answer Ts: | 1,311.29 |
| Ts = System noise temp, (dB-k) | Answer Ts: | 31.18 |
| G/T° = RX Sensitivity, Gr/Ts in dB-K | Answer G/T° | (26.03) |
| To calculate No and Pr/No: | | |
| No = kT° (dBm/Hz) | | |
| Where K = Boltzmann's Constant | | |
| (1.38 * 10^−23) | | |
| T° = TS in degrees Kelvin | | |
| No = kT° in dBm/Hz | Answer No: | (167.42) |
| Pr/No = Pr(dBm) − No(dBm) | | |
| Where Pr/No = Received Pr/No in (dB-Hz) | Answer Pr/No: | 71.22 |
| —continued | | |
| To calculate Received Eb/No: | | |
| Eb/No = Pr/No(dB-Hz) − R(db-bps) + Lo(dB) | | |
| Where R = Data bit rate in kHz | Enter R: | 354.84 |
| Lo = Implementation Loss in dB | Enter Lo: | (5.22) |
| Eb/No is in dBs | Answer Eb/No: | 10.50 |
| To calculate Link Margin, M: | | |
| Where M = Received Eb/No(dB) − Required Eb/No(dB) | | |
| Required Eb/No in dB, based on demod | Enter Eb/No: | 10.50 |
| M = Margin in dB | Answer M: | (0.00) |

This calculated range is based on several assumptions. Some existing GDL ground-to-ground link parameters have been assumed. An exception is transmit power, which has been increased to the full 1 watt allowed by the FCC. A bottom mounted airborne antenna is assumed with a 0 dBi gain, based on a 3° elevation angle with respect to the ground antenna. Another exception is, of course, data rate, which has been reduced to 355 kbps, as discussed previously. Along with the reduction in data rate comes an additional 1.5 dB benefit in required Eb/No, due to the conversion from DQPSK to DBPSK modulation at the lower data rate. An atmospheric absorption loss of 0.21 dB has been assumed, as discussed below regarding the Doppler.

Commercial Wireless LAN transceivers utilize inexpensive crystal oscillators that typically provide a frequency stability of 1–10 ppm. One type of GDL transceiver 136 used with the present invention has a frequency stability of ±12 kHz, which translates to ±5 ppm at 2400 MHZ. Thus, the frequency uncertainty between any two transceivers can be as large as 24 kHz. An analysis of the carrier tracking loop shows that the design can accommodate as much as 125 kHz of frequency uncertainty, with only a 0.22 dB degradation in demodulator performance due to the symbol correlation error at a data rate of 2 Mbps. At 355 kbps, the design can accommodate only 44 kHz of frequency uncertainty for the same 0.22 dB degradation in S/N.

The frequency uncertainties can be calculated as follows. An I and Q complex demodulator convolves the internally generated PN sequence at a stationary frequency with the input signal. Because non-coherent DPSK modulation is used, the I and Q vector correlation output rotates during a symbol time as a function of oscillator drift or Doppler on the input signal. The correlation vector angle therefore can change from the start of the symbol to the end of the symbol. The magnitude of the vector falls off about 0.22 dB at 45° rotation. Beyond 45° rotation, the magnitude of the vector drops rapidly and the symbol decision errors increase. 45° is therefore a reasonable limit of acceptability for the purpose of this analysis. The amount of frequency offset, Δf, of the input signal required to produce a 45° rotation is:

$$\Delta f / 1 \text{ Msps} = 45° / 360°$$

Δf=125 kHz

Solving the equation for Δf produces a result of 125 kHz for a symbol rate of 1 Msps (there are 2 bits/symbol for DQPSK). Solving this same equation for a symbol rate of 355 ksps (1 bit/symbol for DBPSK) produces a result of 44 kHz as shown:

$$\Delta f / 355 \text{ ksps} = 45° / 360°$$

Δf=44 kHz

The Doppler frequency shift at 2465 MHZ that results from a B737-700 flying at its maximum airspeed of 530 miles/hour with respect to a fixed ground station is approxi mately 2 kHz. The frequency offset due to Doppler is defined by the following equation:

$$\Delta f_d = (v/c) * f_c$$

where v=relative velocity, $$v=(530 \text{ mi/hr})(1.61 \times 10^3 \text{ m/mi})(1 \text{ hr}/60 \text{ min})(1 \text{ min}/60 \text{ sec})=237 \text{ m/s}$$

where c=speed of light=$3 \times 10^8$ m/s
and where $f_c$=2465 MHz $$\Delta f = (237 \text{ m/s})/(3 \times 10^8 \text{ m/s}) * 2465 \text{ MHz} = 1.95 \text{ KHz}$$

The total frequency uncertainty of two transceivers, each mounted on an aircraft flying at maximum speed in opposite directions is as follows:

$$\Delta f = (\Delta f_o + \Delta f_d + \Delta f_o + \Delta f_d)$$

$$\Delta f = (12 \text{ kHz} + 2 \text{ kHz} + 12 \text{ kHz} + 2 \text{ kHz}) = 28 \text{ kHz}$$

The resulting 28 kHz of total frequency uncertainty is well within the previously defined limit of 44 kHz for a 355 kbps symbol rate. Therefore, the Doppler shift due to aircraft in flight has a negligible effect on system bit error rate.

The atmospheric absorption loss for a 2.4 GHz ISM Band due to water and oxygen molecule resonance is about 0.0115 dB/mile. This figure of merit is the basis for "other miscellaneous link losses" used to calculate the communication range in the previous section. During heavy rain, the propagation loss for the 2.4 GHz ISM Band increases to nearly 0.5 dB/mile. Weather is usually not a concern for terrestrial applications, because practical distances are normally constrained by multipath interference to less than a mile. For airborne applications, however, where signal fading due to multipath is relatively nonexistent and communication range approaches that of free space, this loss needs to be accounted for in the overall link budget analysis.

The communication range for a GDL air-to-ground link in heavy rain is 11.5 miles (60,650 feet), as shown by the analysis below:

To calculate Receive Power, Pr:
Pr = Pt(dBm) = Gr(dBi) + Gt(dBi) + Lambda^2/(4sd)^2(dB) + Lo

| Where | | | |
|---|---|---|---|
| | dBi = dB's referenced to isotropic gain | | |
| | Pt = Transmit power in dBm | Enter Pt: | 30.00 |
| | Gt = Transmit antenna gain in dBi | Enter Gt: | 0.00 |
| | Gr = Receive antenna gain in dBi | Enter Gr: | 5.15 |
| | Lambda (wavelength) = 300/fc in MHZ | Enter fc: | 2,462.00 |
| | d = Distance in feet | Enter d: | 60,650.00 |
| | Lo = Other misc link losses in dB | Enter Lo: | (5.74) |
| | Pr = Receive power in dBm | Answer Pr: | (96.20) |

To calculate Path Loss, Ls:
Ls = Pr(dBm) − Pt(dBm) − Gt(dBi) − Gr(dBi)

| Where | Ls = Path Loss in dB | Answer Ls: | (131.35) |
|---|---|---|---|

To calculate Receive Sensitivity, G/T°:
G/T° = Gr(dBi) − Ts(dB)

| Where | | | |
|---|---|---|---|
| | F = Receive Noise Figure in dB | Enter F: | 7.01 |
| | Tr = Effective Rx noise temp, °K. | Answer Tr: | 1,166.79 |
| | Tr = Effective Rx noise temp, (dB−K.) | Answer Tr: | 30.67 |
| | Tl = Link noise temp, °K. | Enter Tl: | 100.00 |
| | Tp = Antenna physical temp, °C. | Enter Tp: | 43.33 |
| | Ta = Antenna noise temp, °K. | Answer Ta: | 144.49 |
| | Ts = System noise temp, °K. | Answer Ts: | 1,311.29 |
| | Ts = System noise temp, (dB−k.) | Answer Ts: | 31.18 |
| | G/T° = RX Sensitivity, Gr/Ts in dB−K. | Answer G/T° | (26.03) |

To calculate No and Pr/No:
No = kT° (dBm/Hz)

| Where | | | |
|---|---|---|---|
| | K = Boltzmann's Constant $(1.38*10^{-23})$ | | |
| | T° = Ts in degrees Kelvin | | |
| | No = kT° in dBm/Hz | Answer No: | (167.42) |

Pr/No = Pr(dBm) − No(dBm)

| Where | Pr/No = Received Pr/No in (dB−Hz) | Answer Pr/No: | 71.22 |
|---|---|---|---|

To calculate Received Eb/No:
Eb/No = Pr/No(dB−Hz) − R(db−bps) + Lo(dB)

| Where | | | |
|---|---|---|---|
| | R = Data bit rate in kHz | Enter R: | 354.84 |
| | Lo = Implementation Loss in dB | Enter Lo: | (5.22) |
| | Eb/No is in dBs | Answer Eb/No: | 10.50 |

To calculate Link Margin, M:

| Where | | | |
|---|---|---|---|
| | M = Received Eb/No(dB) − Required Eb/No(dB) | | |
| | Required Eb/No in dB, based on demod | Enter Eb/No: | 10.50 |
| | M = Margin in dB | Answer M: | (0.00) |

With the present invention, it is possible to accommodate a greater number of planes at an airport. At a typical airport, an aircraft may spend 20 minutes at a gate. For example, at one aircraft station with 27 gates, the station can accommodate a peak influx of one aircraft every 45 seconds. A higher influx rate would result in more aircraft on the ground than the 27 gates could accommodate.

With the extended range GDL system of the present invention, it is possible to accommodate a higher influx rate, up to one aircraft every 30 seconds. This analysis clearly illustrates that the GDL system of the present invention provides sufficient bandwidth to accommodate the needs of different airlines. Furthermore, the GDL system of the present invention can be easily expanded to provide twice the capacity by increasing the number of frequency channels used, if necessary.

Table VI shows the departure metrics for an example of 12 busy stations. Based on the assumption that a given aircraft's destination is truly random, the table shows that the probability of having one of these 12 stations as a destination is 54%. The table also shows the probabilities of hitting one of these 12 stations within one to eight trips. The probability of landing at one of these 12 stations within eight flight legs is 99.8%. Given that the average number of flight legs per day is 8.7, then a given aircraft would encounter a GDL equipped airport at least once a day.

TABLE VI

Equipping an Airline's Busiest Stations Results in at Least One GDL Stop Per Day

| SWA Stations | Airport Code | Number of Gates | Maintenance Operations | Intermediate Stations | Weekly Departures | GDL Priority | GDL Departures |
|---|---|---|---|---|---|---|---|
| Phoenix | PHX | 27 | X | | 1122 | 1 | 1122 |
| Las Vegas | LAS | 12 | | X | 957 | 2 | 957 |
| Houston | IAH | 11 | X | | 939 | 3 | 939 |
| Dallas | DAL | 13 | X | | 909 | 4 | 909 |
| Los Angeles | LAX | 9 | | | 785 | 5 | 785 |
| Oakland | OAK | 11 | | X | 738 | 6 | 738 |
| Chicago Midway | MDW | 19 | X | | 690 | 7 | 690 |
| St. Louis | STL | 8 | | X | 593 | 8 | 593 |
| San Diego | SAN | 7 | | | 527 | 9 | 527 |
| San Jose | SJC | 6 | | | 464 | 10 | 464 |
| Baltimore | BWI | 6 | | X | 422 | 11 | 422 |
| Nashville | BNA | 5 | | X | 409 | 12 | 409 |
| Total Departures: | | | | | 15784 | | 8555 |
| Probability of hitting a GDL Equipped Station in one trip | | | | | | | 54.20% |
| Probability of hitting a GDL Equipped Station once in 2 trips | | | | | | | 79.02% |
| Probability of hitting a GDL Equipped Station once in 3 trips | | | | | | | 90.39% |
| Probability of hitting a GDL Equipped Station once in 4 trips | | | | | | | 95.60% |
| Probability of hitting a GDL Equipped Station once in 5 trips | | | | | | | 97.98% |
| Probability of hitting a GDL Equipped Station once in 6 trips | | | | | | | 99.08% |
| Probability of hitting a GDL Equipped Station once in 7 trips | | | | | | | 99.58% |
| Probability of hitting a GDL Equipped Station once in 8 trips | | | | | | | 99.81% |

The 30 second metric for the amount of time it takes to accomplish all file transfers to and from an aircraft once it reaches the ground at one of the proposed 12 GDL equipped stations is based on the following assumptions. Six of the 12 GDL equipped stations have more than 10 gates and six have fewer than 10 gates. The analysis assumes that the once monthly flight deck computer and FMC uploads take place at one of the six GDL equipped stations having fewer than 10 gates. All other routine file transfers are assumed to take place at any of the 12 GDL equipped stations. The supporting analysis is shown in the following Table VII for the airports with more than 10 gates, and Table VIII for the airports with fewer than 10 gates.

TABLE VII

Required Access to GDL Network per Aircraft at GDL Equipped Stations with More than 10 Gates

| Description | Direction | Size (kB) | When | Air vs. Gnd |
|---|---|---|---|---|
| FDC Updates | Upload | 10,000 | Current | Gnd |
| FMC Uploads | Upload | 1,000 | Current | Gnd |
| Electronic Maintenance Logbook | Download | 870 | Future | Gnd |
| FOQA/Engine Trend Data | Download | 3,390 | Current | Gnd |
| OOOI Time Reports | Download | 1 | Current | Gnd |
| Weight & Balance Reports | Upload | 10 | Future | Gnd |
| Flight Release | Upload | 10 | Future | Gnd |
| Cabin Maintenance Log | Download | 20 | Future | Gnd |
| Graphical Weather | Upload | 130 | Future | Gnd |
| Total | | 4,431 | | |
| Time in minutes @ 1.2 Mbps | | 0.49 | 29,54202 seconds | |
| Min rq'd RF Link Data Rate in Mbps | | 1.33 | | |
| Assumptions | | | | |
| Compression Ration | 2.00 | | | |
| RF Link Overhead | 0.67 | | | |
| Flights/Day Round (2300/264,1) | 8.7 | | | |

TABLE VII-continued

Required Access to GDL Network per Aircraft at GDL Equipped Stations with More than 10 Gates

| Description | Direction | Size (kB) | When | Air vs. Gnd |
|---|---|---|---|---|
| Flt-Hrs/Day/Aircraft (8.7 * 1.33) | 11.571 | | | |
| Avg Flight Time (hrs) | 1.33 | | | |
| Time Between GDL Stops (days) | 1 | | | |
| No of Gates at Hub/Station | 27 | | | |
| Avg time on Ground at Gate (mins) | 20 | | | |
| Peak Landing Rate (sec) | 44.4444444 | | | |
| Engine Trend Data (kB/Flt-hr) | 586 | | | |

FDC, FMC Updates not included at stations with > 10 gates

TABLE VIII

Required Access to GDL Network Per Aircraft At GDL Equipped Stations with Less than 10 Gates

| Description | Direction | Size (kB) | When | Air vs. Gnd |
|---|---|---|---|---|
| FDC Updates | Upload | 10,000 | Current | Gnd |
| FMC Uploads | Upload | 1,000 | Current | Gnd |
| Electronic Maintenance Logbook | Download | 870 | Future | Gnd |
| FOQA/Engine Trend Data | Download | 3,390 | Current | Gnd |
| OOOI Time Reports | Download | 1 | Current | Gnd |
| Weight & Balance Reports | Upload | 10 | Future | Gnd |
| Flight Release | Upload | 10 | Future | Gnd |
| Cabin Maintenance Log | Download | 20 | Future | Gnd |
| Graphical Weather | Upload | 130 | Future | Gnd |
| Total | | 15,431 | | |
| Time in minutes @ 1.2 Mbps | | 1.71 | | |
| Min rq'd RF Link Data Rate in Mbps | | 1.55 | | |

TABLE VIII-continued

Required Access to GDL Network Per Aircraft At GDL Equipped Stations with Less than 10 Gates

| Description | Direction | Size (kB) | When | Air vs. Gnd |
|---|---|---|---|---|
| Assumptions | | | | |
| Compression Ration | | 2.00 | | |
| RF Link Overhead | | 0.67 | | |
| Flights/Day Round (2300/264,1) | | 8.7 | | |
| Flt-Hrs/Day/Aircraft (8.7 * 1.33) | | 11.571 | | |
| Avg Flight Time (hrs) | | 1.33 | | |
| Time Between GDL Stops (days) | | 1 | | |
| No of Gates at Rub/Station | | 9 | | |
| Avg time on Ground at Gate (mins) | | 20 | | |
| Peak Landing Rate (sec) | | 133.333333 | | |
| Engine Trend Data (kB/Flt-hr) | | 586 | | |

FDC, FMC Updates not included at stations with < 10 gates

Table IX shows one basis for estimating the size of the combined FOQA/Engine Trend Data Files. The number of 12 bit words and some sample rates are based on the B757-200 FOQA files that are currently downloaded for one known airline. In this example, these files are approximately 345,600 bytes in size per flight hour. The contained parameters are sampled once every second, once every two seconds, once every four seconds, and once every 64 seconds. The file size increases from previous files because some parameters are sampled as often as four times/second for 15 minutes of every one hour flight. Some parameters are sampled as often as once per second instead of one every two or four seconds for the duration of the flight.

TABLE IX

Basis for Estimating FOQA/Engine Trend Data File Size

Estimated FOQA/Engine Trend Data File Size

| Parameter Type | Number of 12 Bit Words | Sample Rate (Hz) | Flight Duration (mins) | Sample Rate (Hz) | Flight Duration (mins) | File Size |
|---|---|---|---|---|---|---|
| Miscellaneous, Noncritical | 32 | 0.015625 | 15 | 0.015625 | 45 | 2700 |
| Startup, Take-off, Shutdown | 20 | 4 | 15 | 1 | 45 | 189000 |
| Flight Duration Critical | 20 | 1 | 15 | 1 | 45 | 108000 |
| Miscellaneous, Critical | 53 | 1 | 15 | 1 | 45 | 286200 |
| TOTAL | 125 | | | | Uncompressed | 585900 |

Figure 9:
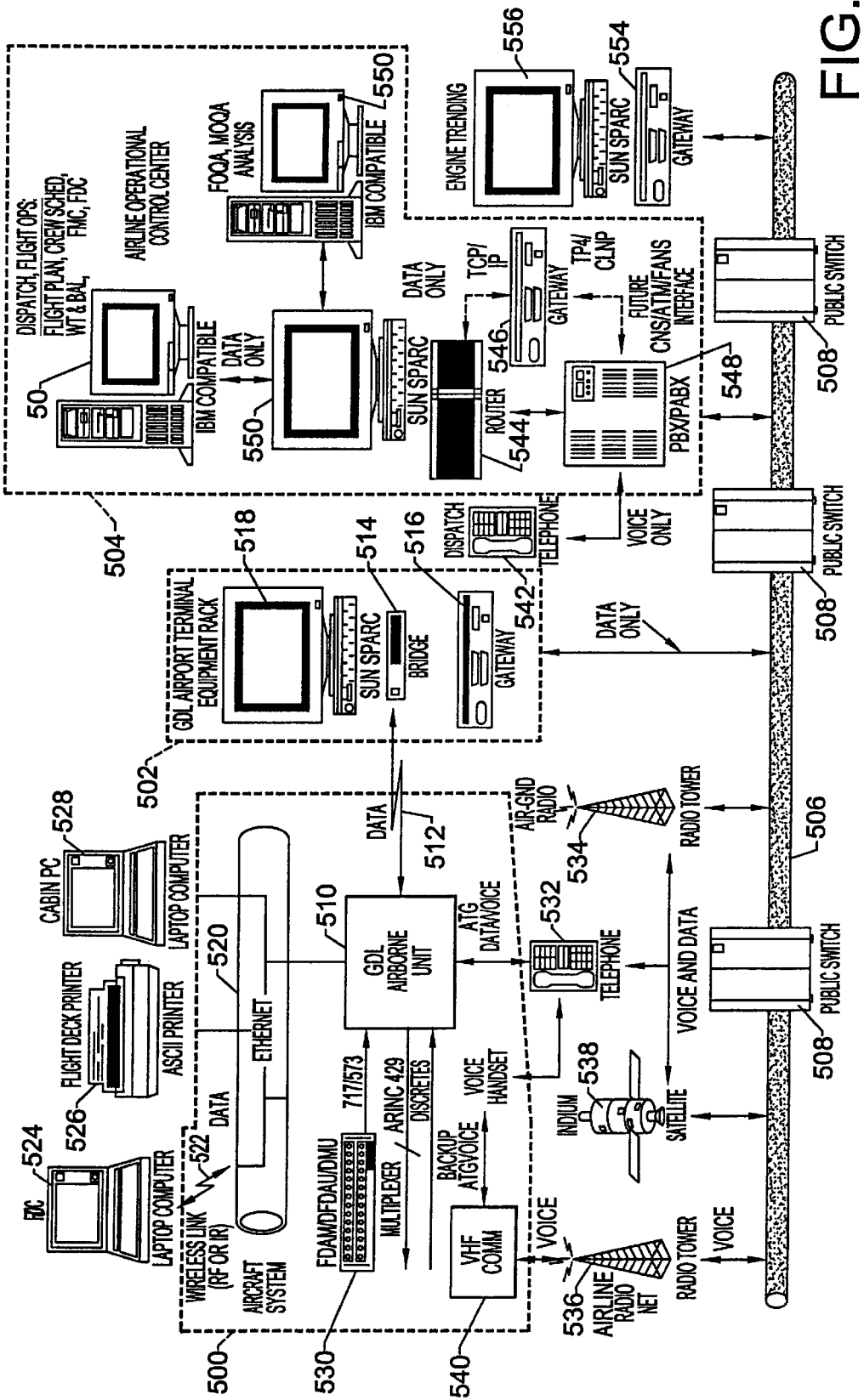
FIG. 9 is a detailed schematic drawing showing the interconnection of an airport network and ground data link network.

FIG. 9 illustrates one possible airline network architecture in one embodiment of the present invention. The entire network is based on the ubiquitous, Internet standard TCP/IP protocols. A future TCP/IP to TP4/CLNP gateway is shown for compatibility with the current industry baseline for ATC networking. For purposes of clarity, reference numerals describing this aspect of the present invention will being in the 500 series.

FIG. 9 illustrates this efficient system showing the aircraft system by dashed line indicated at 500, a GDL airport terminal indicated by dashed line at 502, and the dispatch, flight operations indicated by dashed line at 504. These three units connect into the public switched telephone network and airline wide area network 506, which includes representative public switches. The aircraft system includes a GDL unit 510 positioned on an aircraft that connects via a data connection 512 to the GDL airport terminal 502 with a bridge 514 and a gateway 516 to Sun SPARC computer terminal 518 as a representative processor. The GDL airborne unit also connects to an Ethernet backbone 520 that can connect via a wireless link 522 to a flight deck computer 524, an ASCII printer as part of a flight deck printer 526, and a cabin PC 528. The GDL airborne unit 510 can also connect to the FDAM/DFDAU/DMU 530 and a cabin telecommunications unit (CTU), i.e., telephone switch, 532 outside the system. The telephone switch can connect voice and data through a part 22.801 air-ground radio telephone or other cellular service to an air-ground radio tower 534 and a radio net 538 through an Iridium or other satellite service provider 538. Voice only communication can be established via a VHF comm transceiver 540 through the airline's private radio network. At the dispatch flight operations 504, dispatch telephone 542 can connect through the airline's PBX/PABX 548 to router and gateway 544, 546 as known to those skilled in the art. These components connect to various terminals 550, which could include IBM or Sun SPARC work stations as known to those skilled in the art. Additionally, for engine event reporting, data relating to engine events can be reported directly to an engine trending area having a gateway 554 and Sun workstations 556.

As noted above, the ground data link network of the present invention can use standard TCP/IP network protocols along with Ethernet data link protocols to provide computer communications among the GDL networked host. The TCP/IP protocol incorporates Internet networking, allowing host peer-to-peer connectivity. The GDL network implements this technology into a private network as illustrated in FIG. 9 for GDL host communications. The example of the merging of an airline network and GDL network is now described with reference once again to FIG. 9.

The GDL Wide Area Network (WAN) hardware architecture could include multiple airport terminal local area networks (LANs) and a single Airline Operational Control Center (AOCC) LAN. Components within each LAN include multiple host nodes (such as the illustrated Sun workstations, PCs, wireless access nodes) and a network gateway. Each LAN could provide a 10 or 100 megabit Ethernet connection to implement the data link protocol, as is well known to those skilled in the art. Each host attachment to the LAN could be accomplished via an Ethernet based network interface card (NIC). Each LAN could include an ISDN gateway attachment for inter-LAN communication, providing 64 kbit to 256 kbit data transmissions.

Each GDL network host would typically have Commercial Off The Shelf (COTS) software installed providing network connectivity control. This would include Ethernet drivers for the NICs and a TCP/IP network kernel implementing transport and Internet TCP/IP network layer protocols. Each host includes TCP/IP application protocols to implement common network operations. In addition, various TCP/IP network server applications could be installed on Sun workstations to support typical networking operations (ex. FTP, Email, NFS).

The GDL network could be pre-configured as a private TCP/IP network. Each LAN in the network could be identified as a subnet domain and assigned a unique subnet identified IP address. Each network component attached to a subnet could be assigned a unique IP address for that particular domain. This would be a static IP address assignment and would not be altered after installation. A domain name server would not be employed on the GDL network, and therefore, each host would contain internal IP address information of other GDL host for network connectivity. Each networked host would be an identification table containing available host names matched with assigned IP addresses. The host network applications would use either an IP address or host name to identify and communication with another host on the network.

The GDL IP address is a 32-bit "class A" IP address, and is used for private network operation (10.0.0.0 domain). In this described embodiment, this IP address format consists of four fields: class, network identifier, subnet identifier, and host identifier. Table X describes the GDL IP address format using the TCP/IP standard with subnetting for the GDL network.

TABLE X

Class A-IP Address Format

| Class | | Network ID | | SubNet ID | | Host ID | |
|---|---|---|---|---|---|---|---|
| 0 | 1 | 7 | 8 | 15 | 16 | 31 | |

| Fieldname | Bit Position | Purpose |
|---|---|---|
| Class | 0 | Class A IP format |
| Network ID | 1–7 | Private Network ID |
| SubNet ID | 8–15 | Subnet ID |
| Host ID | 16–31 | Individual host ID |

In order to integrate the GDL and another computer network, an organized plan for the resultant network architecture is developed. Typically, an airline network uses TCP/IP network protocol over an Ethernet data link backbone. Naturally, there may be areas of incompatibility that would have to be resolved for this integration effort. The GDL network architecture has the flexibility for modifications to conform with other TCP/IP based networks. When the integration effort is complete, the revised representative airline and GDL network would be viewed as a single operational computer network, rather than two distinct interconnected networks.

Some airline networks are formed as a private WAN network utilizing TCP/IP for the network protocol along with a 10 megabit Ethernet to support the network data link. Because both airline and GDL networks incorporate Ethernet to provide the data link network functionality, this networking area should be compatible. Cabling for the GDL network typically uses 10Base-T for physical connectivity requirements, however, it is adaptable to other existing Ethernet cabling standards.

For inter-networking activities, GDL utilizes ISDN gateways to provide network connectivity. However, GDL is not limited to ISDN and can incorporate other existing gateway components utilized by the representative airline.

Since both the airline and GDL network hosts, include a TCP/IP network kernel and Ethernet drivers, the basic network software control for each network component should be in place. In addition, any server functionality to be shared between the networks needs examination to ensure proper operation. Also there may be a merging of some software process currently used on both networks into a single network application (e.g., Email server). This requires verification of the associated network operation within the integrated network structure.

Each host on the airline and GDL network employs a TCP/IP network kernel to implement networking activities. However, the capability of the network configuration between these two systems requires additional consideration. The TCP/IP standard requires a unique 32-bit IP address assignment to identify each individual network host.

The format of the GDL IP address is configured to incorporate subnet addressing. This addressing scheme provides a three-level hierarchy of identification: network, subnet and host identification. This subnetting implementation allows for multiple network domains within the GDL global network structure. Each GDL airport terminal system is assigned a particular subnet domain and all network hosts within that domain are assigned IP addresses using the subnet identification. Integration of the airline network and GDL network will require a review of the IP address format used within each network. Assuming the airline network utilizes network domains and there exist available IP addresses, the GDL network would adapt the airline address format.

For host network identification, each host on the GDL network has been pre-assigned a unique IP address. This is a static address and will not change following installation. However, should the airline network require the use of a dynamic IP address assignment (e.g., dynamic host configuration protocol), the present GDL network component IP address allocation scheme can be reconfigured to obtain its IP address from the airline IP address allocation network server.

To connect to a computer on the GDL network, each GDL host has an internal table, containing IP addresses and associated computer names, and listing all other available hosts on the network. Whenever a computer name is selected for connection, the address table is utilized to determine the associated host IP address. However, should the airline employ a domain name structure and utilize a Domain Name Server (DNS) for IP address lookup, the GDL host can be reconfigured to make use of such a server to supply host addresses for network connectivity.

There are also two fundamental issues to be ddressed when implementing a representative airline network architecture, which are a departure from traditional networks. The first is how to address the mobile aircraft LANs that roam from subnet to subnet. The second is, given multiple network connection options and associated costs, how to route files via the most economical path, while taking into consideration message priorities. The solution to the latter issue is illustrated in the flow chart shown in FIG. 10.

Figure 10:
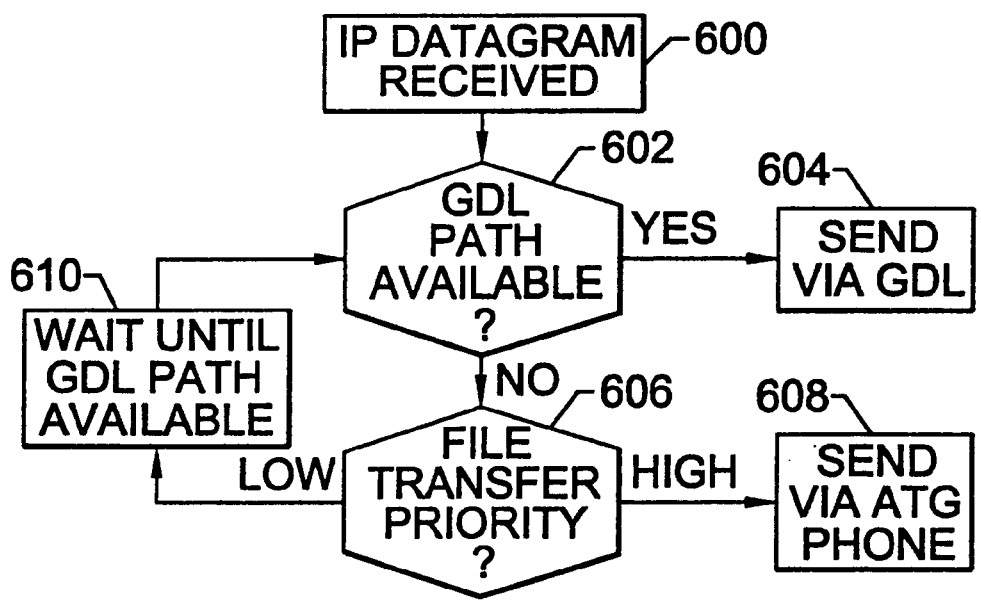
FIG. 10 is a flow chart showing basic file transfer.

The cost based routing algorithm shown in FIG. 10 is implemented in the GDL airborne segment, for files originating onboard the aircraft and in the system controller located at the airline operational control center, for files originating from the ground network.

As shown in the flow chart of FIG. 10, when the IP datagram is received (Block 600), a determination is made whether the GDL path is available (Block 602). If it is, then the datagram is sent via the ground data link unit (Block 604). If it is not available, then a determination is made whether the file transfer has priority (Block 606). If that determination is high, it is sent via the ATG phone (Block 608). If it is not, then a file transfer is delayed until a ground data link path is available (Block 610).

The proposed method for addressing the mobile aircraft LANs is an extension of the method GDL currently addresses the issue. When an aircraft lands at a GDL equipped airport, an IP address is dynamically assigned to it by a DHCP server application hosted on the sun SPARC server shown in the GDL airport terminal equipment rack in FIG. 9. Each GDL equipped airport is a different subnet on the WAN. The temporary DHCP IP address is, in effect, an alias that the GDL airborne segment uses to transfer files over the TCP/IP based network. A system controller (SC) at an airline operational control center recognizes the GDL airborne segment by its tray number, which is a hard coded series of pins at an ARINC 600 connector interface. The system controller maintains a database relationship between tray numbers and aircraft tail numbers.

The GDL airborne segment is an end node or "client" on the network. It can also be a router for other clients on the aircraft LAN. To address this difference, it is possible to use a mobile IP, which is an extension to IP, and a recent Internet standard specified in RFC 2002. A mobile IP consists of three components: mobile nodes, foreign agents and a home agent. A system controller at an airline operational control center is the home agent.

The GDL airborne segment (AS) acts as a foreign agent for the other mobile nodes connected to it on the aircraft LAN, as well as its own foreign agent. When the AS comes up, it attempts to register with a GDL wireless router. If it is successful, it recognizes that it has proximal access to a GDL equipped airport and requests a temporary IP address from the DHCP server. It then registers this "care of" address with the home agent, i.e., the SC, and acts as its own foreign agent. It then sends out a "foreign" broadcast message to the other aircraft clients, and acts as their foreign agent as well. When the AS leaves the GDL equipped airport and can no longer receive a probe signal, it dials up the SC via the ATG phone system, informs the home agent of its presence on the home network, and defaults to its home network fixed IP address. Once the AS registers its home IP with the home agent, unless it has high priority files to transfer, it terminates the call to avoid usage fees. If the AS is on its home network, IP addressing and datagram delivery to and from the AS, work as they would without mobile IP. A possible mobile IP approach is illustrated in FIGS. 11A and 11B.

As shown clearly in FIG. 11A, the mobile node (OPC) 700 communicates with the mobile node/foreign agent 702 of the ground data link airborne system (AS). This in turn can communication with the ATG phone system 704. The system controller 706 acts as a home agent. FIG. 11B illustrates an example of the GDL airborne system acting as its own foreign agent on a foreign subnet and a foreign agent for other mobile nodes. Instead of an ATG phone system radio tower, an airport terminal equipment rack 708. Steps are similar as in those steps of FIG. 11A except between the mobile node/foreign agent 702 and the airport terminal equipment rack 708 acting as a PHX station.

From the perspective of the aircraft LAN mobile nodes, they are typically on a foreign subnet and use the mobile IP provided to them from the AS acting as a foreign agent. The AS sends out a "foreign" broadcast message to the other aircraft mobile nodes and its current IP, depending on whether its connection options are the ATG phone system or GDL, respectively. If the GDL connection option is available, then the AS sends out its temporary DHCP IP address, or "foreign" address, which the aircraft LAN mobile nodes register with the home agent as their "care of" address. If the GDL connection option is not available, then the AS sends out its fixed IP address, or "home" address, which the aircraft LAN mobile nodes register with the home agent as their "care of" address.

Once the mobile nodes have registered with the home agent, all IP traffic addressed to them is received by the home agent, encapsulated in another IP datagram, and then "tunneled" to the foreign agent. The foreign agent forwards the datagrams to their respective mobile nodes. In the reverse direction, the mobile nodes can bypass the home agent and send datagrams directly to their destination.

Table XI provides an example of how the GDL system controller will keep track of available data communication options so that ground originating network traffic can be routed to the aircraft in the most cost effective manner possible. The table shows that the system controller identifies the phone number associated with each individual aircraft and either its static, or "home" IP address, or its temporary DHCP "foreign" IP address. The process described in the preceding paragraphs guarantees that the lowest cost routing option is used for high priority messages, since the AS always registers its temporary DHCP "foreign" IP address if it has proximal access to a GDL equipped airport. For low priority file transfers, the AS and SC store the files until the GDL connection option is available.

TABLE XI

Dynamic Messaging Address Table

| Tail Number | Tray Number | Static Phone Number | AS Static "Home" IP | AS Dynamic "Foreign" IP |
| --- | --- | --- | --- | --- |
| N631 | xxxxxx | xxx.xxx.xxxx | xx.x.xxx.xx | xx.x.xxx.xx |
| N632 | xxxxxx | xxx.xxx.xxxx | xx.x.xxx.xx | xx.x.xxx.xx |

The following list describes the process steps that result in updating the dynamic IP address of a GDL accessible aircraft:

1. N631 lands at a GDL equipped station.
2. N631 registers with the network and is assigned a dynamic IP address.
3. N631 registers its temporary "foreign" IP and its tray number (xxxxxx) with the home agent, i.e., SC.
4. SC maintains the dynamic messaging address table.
5. SC uses the temporary "foreign" IP, when available, for all file transfers.
6. N631 leaves the GDL equipped station and can no longer receive the ABS probe.
7. N631 registers its "home" IP address with the home agent, i.e., SC.
8. SC replaces the temporary "foreign" IP with the "home" IP.
9. ABS returns surrendered IP address to DHCP pool.
10. SC always knows what data messaging connection options are available.
11. SC utilizes dynamic IP for all low priority and in-range high priority messaging.
12. SC utilizes static IP for high priority messaging when aircraft is not GDL accessible.
13. SC utilizes ubiquitous TCP/IP protocol stack for all file transfers, independent of connection method.

It is also possible to use the ground data link unit of the present invention to automatically distribute various updates of flight management computer navigation database files for the air transport industry. These updated files can have customized performance factors on a per aircraft basis.

As known, the air transport industry is required by the International Civic Aviation Organization (ICAO) to update its navigation database files every 28 days. As a result, air carriers typically purchase these files from a company like Jeppesen, a leader in the navigation data services industry. Jeppesen offers a NavData Direct Update Service which converts the navigation database from the standard ARINC 424 specified format to an airline's vendor specific avionics system. Using computer software developed by the avionics manufacturer and licensed to Jeppesen, ARINC 424 data is formatted into customized updates that can then be loaded directly into the airline's specific navigation equipment. A common media used to transfer this information is the IBM PC compatible 3.5" high density floppy disk.

Airlines receive, copy and disseminate navigation database files to every aircraft in their fleet every 28 days. A programmable data loader device is used to copy the files from the floppy disk to the aircraft's flight management computer (FMC) 160 (FIG. 15). Typically each aircraft contains one or two FMCs and either one or two interface connectors located in the flight deck. When the FMC is reprogrammed with a new navigation database, customized performance factors such as drag factor and fuel flow are reset to the default values contained on the navigation database media. If the performance factors for a given aircraft should be different than the default values, then these aircraft specific performance factors are recorded before the new navigation database is loaded. Once the new navigation database is loaded, these default performance factors must then be manually reprogrammed back to their original value.

The programmable data loader receives its power from the FMC database loader interface connector. Once the programmable data loader powers up and passes its internal self test, status is displayed indicating that the unit is ready for operation and the floppy is inserted into the disk drive. The file transfer begins automatically. Status is displayed on the programmable data loader that indicates whether or not the data transfer is in progress or complete. If the files reside on more than one floppy, a disk change status is indicated to alert the user to swap disks. If the data transfer fails, power is cycled to reset the data loader and the process starts over.

Following the navigation database update, a series of manual process steps are followed to verify that the FMC was programmed correctly. Because the FMC is designated as "flight critical," it is important to verify that it has been programmed correctly. The IDENT page on the CDU is checked to verify that the new NAV DATA has been loaded. The type of aircraft and the type of engines are verified to reflect the correct aircraft configuration. The OP PROGRAM part number and the NAV DATA part number are verified against the proper part numbers obtained from the airline's technical operation's department. Today's date is verified to be within the validity start and end dates of the navigation database that was loaded. If the default performance factors are used, then the drag factor and fuel flow factors are also verified to be correct.

Once the first FMC is programmed, the process is either repeated for the second FMC using the data loader, or the files are copied from the first FMC to the second FMC, depending on the aircraft and the availability of a second interface connector. Once both FMCs have been programmed with the new navigation database, any custom performance factors that need to be changed from their default values are manually reprogrammed. One of the functions of the FMC is to provide an energy management function to optimize flight performance based on cost, time, fuel or range. The energy management function is tailored to an individual airline's operating economics, local fuel costs and the constraints of the air traffic environment. Performance factors tend to be grouped as a function of every airframe/engine combination. Drag factor, fuel flow, maneuver margin, approach speeds, optimum altitude, maximum altitude, minimum cruise time, minimum rate of change of climb, and minimum rate of change of cruise, are examples of performance factors that may be customized to a value that is different from the default values. These performance factors are manually programmed via the control/display unit (CDU) and are stored in the FMC's non-volatile memory. These performance factors are typically changed in both FMCs at the same time, following the navigation database update.

These performance factors can be considered as falling into two categories: static and dynamic. Drag factor is an example of a static performance factor that does not change from month to month unless the aircraft is physically modified. Cost index is an example of a dynamic performance factor that can change on a per flight basis. If the flight is late in departing and the airline wishes to make up time, the cost index can be set to a lower value. This permits the aircraft to fly at a lower than optimum cruise altitude and change altitude as a faster rate. This is less fuel efficient and therefore increases operating cost. If the flight is on schedule, the cost index can be set to a higher value. This constrains the aircraft to change altitude at a slower rate and fly at a higher, more fuel efficient cruise altitude. This reduces operating cost.

The logistics involved in planning, tracking and accomplishing the task of updating each aircraft's flight management computer every 28 days is a formidable task. Most airlines have a great deal of diversity in their aircraft fleet, in terms of airframe manufacturers, e.g., Boeing, McDonnell Douglas, Lockheed, Airbus, etc., families, e.g., B737, B757, B767, models, e.g., B757-300, B737-500, B737-700, etc. This translates to dozens of airframe/engine combinations in hundreds of aircraft that are spread over thousands of miles and are constantly in motion and subject to highly dynamic scheduling changes. Sufficient copies of required floppy disks are obtained and deployed along with programmable loader devices so that these new uploads can take place monthly at numerous sites within minimum disruption to airline operations. The air transport industry's entire process of disseminating, programming, verifying and customizing the navigation database is essentially a manual operation.

To further complicate the process, the FMC is not the only avionics equipment that requires periodic software updates. Dozens of other equipment require periodic updates and the list is growing in newer production aircraft. Just getting the right disks to the right aircraft at the right time requires significant effort and resources.

Generic airframe/engine based navigation database files can be customized on a tail number unique basis. New navigation database files for each airframe/engine combination in an airlines, fleet are obtained every 28 days from a service such as Jeppesen's NavData Direct Update Service. In a preferred embodiment, these files are obtained directly from a secure Jeppesen web site via an Internet connection over the Public Switched Telephone Network (PSTN). A variety of security features are implemented to authenticate the source files and ensure the integrity of the file transfer process. These files are downloaded to a directory on the GDL system controller. The performance factors for each aircraft in the airlines' fleet is maintained in a database resident on the GDL system controller on a per tail number basis. This database is accessed by a software application which customizes the Jeppesen provided navigation database files based on the unique performance factors for each aircraft. This software application creates a unique set of navigation database files for each tail number in the fleet inventory.

The present invention also provides a system for automatically delivering new navigation database files to the aircraft. These tail number unique navigation database files are disseminated via the PSTN to aircraft specific directories resident on airport base station servers contained within airport terminal equipment racks installed at GDL-equipped airports.

When aircraft land at GDL-equipped airports, the GDL airborne segment installed on each aircraft connects to the airport base station server via a wireless LAN connection. The GDL airborne segment moves the new navigation database files from the tail number unique directory on the airport base station server to a directory resident within the GDL airborne segment.

The present invention also provides a method for reprogramming the FMC with the new navigation database files. Once the new navigation database files have been retrieved, the FMC is reprogrammed via the programmable data loader interface. The GDL airborne segment is wired in parallel to the programmable data loader interface connector located in the flight deck. When power is removed from the GDL airborne unit, a high impedance is presented to the FMC interface in order to preserve the existing method for reprogramming the FMC using a programmable data loader. This GDL airborne unit interface design is such that the GDL airborne unit is only electrically connected to the FMC when the GDL airborne unit has received new navigation database files, the aircraft is on the ground, and the GDL airborne unit is powered on. When these conditions are met, the GDL airborne unit reprograms the FMC with the new tail number unique navigation database files. The GDL airborne unit interface is also designed so that failures cannot affect FMC performance.

This invention automates the following rocess steps:
1. Customizing the default performance factors in advance for each individual aircraft.
2. Delivering the new navigation database files to the aircraft.
3. Programming the FMC with the new navigation database files.

The fourth step is verifying that the FMC was programmed correctly. In a sense, this step is accomplished automatically via the file transfer protocol and acknowledgment process defined in the ARINC 603 or ARINC 615 airborne computer data loader specification. Based on the flight critical nature of the FMC, the inventors do not imply that this step completely eliminates the need to manually verify that the FMC was programmed correctly once the new navigation database has bee loaded.

This application is related to copending patent applications entitled, "WIRELESS-BASED AIRCRAFT DATA COMMUNICATION SYSTEM WITH AUTOMATIC FREQUENCY CONTROL," "WIRELESS SPREAD SPECTRUM GROUND LINK-BASED AIRCRAFT DATA COMMUNICATION SYSTEM WITH VARIABLE DATA RATE," "WIRELESS SPREAD SPECTRUM GROUND LINK-BASED AIRCRAFT DATA COMMUNICATION SYSTEM WITH APPROACH DATA MESSAGING DOWNLOAD," "WIRELESS SPREAD SPECTRUM GROUND LINK-BASED AIRCRAFT DATA COMMUNICATION SYSTEM WITH AIRBORNE AIRLINE PACKET COMMUNICATIONS," and "WIRELESS SPREAD SPECTRUM GROUND LINK-BASED AIRCRAFT DATA COMMUNICATION SYSTEM FOR UPDATING FLIGHT MANAGEMENT FILES," which are filed on the same date and by the same assignee, the disclosures which are hereby incorporated by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A system for providing a record of the performance of an aircraft engine comprising:
    a plurality of sensors positioned on the aircraft for sensing engine conditions and generating engine data relating to operation of the engine;
    a ground data link unit positioned within the aircraft and operatively connected to said plurality of sensors for receiving said engine data, said ground data link unit comprising:
        a) a data store operative to accumulate and store the engine data, and
        b) a wideband spread spectrum transceiver coupled to said data store, and comprising a transmitter that is operative to download said engine data that has been accumulated and stored by said data store over a wideband spread spectrum communication signal; and
    a ground based spread spectrum transceiver for receiving the wideband spectrum communication signal from the aircraft and demodulating the wideband spread spectrum communication signal to obtain the engine data.

2. A system according to claim 1, wherein said aircraft includes a FADEC engine control system, wherein said sensors are operatively connected to said FADEC engine control system.

3. A system according to claim 1, wherein said sensors are positioned to sense at least one of said core compartment bleeding, sump pressurization, sump vent, active clearance control, and low pressure and high pressure recoup.

4. A system according to claim 1, wherein said sensors are positioned to sense at least one of oil pressure, oil temperature, fuel flow and engine hydraulics.

5. A system according to claim 1, and further comprising a plurality of sensors located throughout the aircraft for sensing routine aircraft conditions and generating parametric data such as received by a flight data recorder representative of aircraft flight performance during a flight of said aircraft.

6. A system according to claim 5, and further comprising a multiplexer connected to said plurality of sensors and ground data link unit for receiving the parametric data and multiplexing the parametric-data for delivery to said ground data link unit.

7. A system according to claim 1, and further comprising a ground based server connected to said ground based spread spectrum receiver for receiving said engine data for further processing of said engine data.

8. A system according to claim 1, and further comprising a remote flight operations center operatively coupled to said ground based spread spectrum transceiver for receiving and processing engine data downloaded from said aircraft.

9. A system according to claim 1, wherein the wideband spread spectrum communication signal comprises a direct sequence spread spectrum signal.

10. A system according to claim 1, wherein the wideband spread spectrum communication signal comprises a frequency hopping spread spectrum signal.

11. A system according to claim 1, wherein said data store comprises an archival data store.

12. A system according to claim 1, wherein said ground data link unit is operative to store flight performance data and download said flight performance data over said wideband spread spectrum communication signal.

13. A method of providing a record of the performance of an aircraft engine comprising:
  collecting engine data within a ground data link unit during at least initial take-off of an aircraft from an airport;
  processing the engine data within a central processing unit of the ground data link unit to determine engine problems;
  upon initial take-off, downloading the engine data that has been collected during initial take-off over a wideband spread spectrum communication signal to a ground based spread spectrum receiver; and
  demodulating within the ground based spread spectrum receiver the wideband spread spectrum communication signal to obtain the engine data for further processing.

14. A method according to claim 13, and further comprising the step of forwarding the engine data to a ground based server connected to the ground based spread spectrum receiver and processing the engine data within the ground based server.

15. A method according to claim 13, wherein the wideband spread spectrum communication signal comprises a direct sequence spread spectrum signal.

16. A method according to claim 13, wherein the wideband spread spectrum communication signal comprises frequency hopping spread spectrum signal.

17. A method of providing a record of the performance of an aircraft engine comprising:
  collecting engine data within a ground data link unit during engine operation;
  downloading the engine data that has been collected over a wideband spread spectrum communication signal to a ground based spread spectrum receiver; and
  demodulating within the ground based spread spectrum receiver the wideband spread spectrum communications signal to obtain the engine data for further processing.

18. A method according to claim 17, and further comprising the step of collecting engine data within an archival data store of the ground data link unit.

19. A method according to claim 17, and further comprising the step of collecting engine data during at least initial take-off of the aircraft.

20. A method according to claim 19, and further comprising the step of downloading the engine data upon initial take-off.

21. A method according to claim 17, wherein the wideband spread spectrum communication signal comprises a direct sequence spread spectrum communication signal.

22. A method according to claim 17, wherein the wideband spread spectrum communication signal comprises a frequency hopping spread spectrum communication signal.

23. A method according to claim 17, wherein the ground based spread spectrum receiver comprises a transceiver.

* * * * *

UNITED STATES PATENT AND TRADEMARK OFFICE
CERTIFICATE OF CORRECTION

PATENT NO. : 6,353,734 B1
DATED : March 5, 2002
INVENTOR(S) : Wright et al.

It is certified that error appears in the above-identified patent and that said Letters Patent is hereby corrected as shown below:

Column 1,
Lines 6-9, delete "This application is a continuation of Serial No. 09/344,5224 filed on June 25, 1999, U.S. Pat. No. 6,143,179, the disclosure of which is hereby incorporated by reference in its entirety." substitute -- This application is a continuation of Serial No. 09/344,522 filed on June 25, 1999, U.S. Pat. No. 6,148,179, the disclosure of which is hereby incorporated by reference in its entiety. --

Column 31,
Line 47, delete "has bee" substitute -- has been --

Signed and Sealed this

Twenty-seventh Day of August, 2002

Attest:

Attesting Officer

JAMES E. ROGAN
Director of the United States Patent and Trademark Office